(12) United States Patent
Lorbeer

(10) Patent No.: US 11,431,145 B2
(45) Date of Patent: Aug. 30, 2022

(54) SOLID-STATE LASER GAIN MEDIUM WITH INCLINED REFLECTIVE PLANES FOR PUMP AND SEED RADIATION CONFINEMENT

(71) Applicant: Deutsches Zentrum fuer Luft—und Raumfahrt e.V., Cologne (DE)

(72) Inventor: Raoul-Amadeus Lorbeer, Magstadt (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 109 days.

(21) Appl. No.: 16/178,885

(22) Filed: Nov. 2, 2018

(65) Prior Publication Data

US 2019/0140417 A1    May 9, 2019

Related U.S. Application Data

(63) Continuation of application No. PCT/EP2017/060970, filed on May 9, 2017.

(30) Foreign Application Priority Data

May 9, 2016    (DE) .................... 10 2016 108 474.3

(51) Int. Cl.
*H01S 3/08*    (2006.01)
*H01S 3/06*    (2006.01)
(Continued)

(52) U.S. Cl.
CPC ........ *H01S 3/08095* (2013.01); *H01S 3/0604* (2013.01); *H01S 3/0617* (2013.01);
(Continued)

(58) Field of Classification Search
CPC ............. H01S 3/094084; H01S 3/0621; H01S 3/0623; H01S 3/0625; H01S 3/08095;
(Continued)

(56) References Cited

U.S. PATENT DOCUMENTS 4,555,786 A * 11/1985 Byer ..................... H01S 3/0602
372/34
4,890,289 A * 12/1989 Basu ....................... H01S 3/042
372/33
(Continued)

FOREIGN PATENT DOCUMENTS

DE    2108439    9/1972
DE    4344227    1/1995
(Continued)

OTHER PUBLICATIONS

Antognini et al.; Thin-Disk Yb:YAG Oscillator-Amplifier Laser, ASE, and Effective Yb:YAG Lifetime; IEEE Journal of Quantum Electronics, vol. 45, No. 8; Aug. 2009; 13 pages.

(Continued)

*Primary Examiner* — M. A. Golub-Miller
(74) *Attorney, Agent, or Firm* — Lipsitz & McAllister, LLC

(57) ABSTRACT

The invention relates to a discoidal or cuboidal solid body for a laser amplification system of a solid-state laser, which solid body contains at least one laser-active material, has an upper side defining an upper side plane and a lower side defining a lower side plane, wherein the upper side plane and the lower side plane are inclined in relation to each other and enclose an angle of inclination, wherein the lower side is provided with a first reflective coating, wherein the upper side is provided with a second reflective coating, and wherein at least one of the upper side and the lower side has at least one optical input coupling opening for input coupling at least one of a seed laser radiation field and a pump laser radiation field into the solid body between the first and the second reflective coating.

16 Claims, 14 Drawing Sheets

Figure 1:
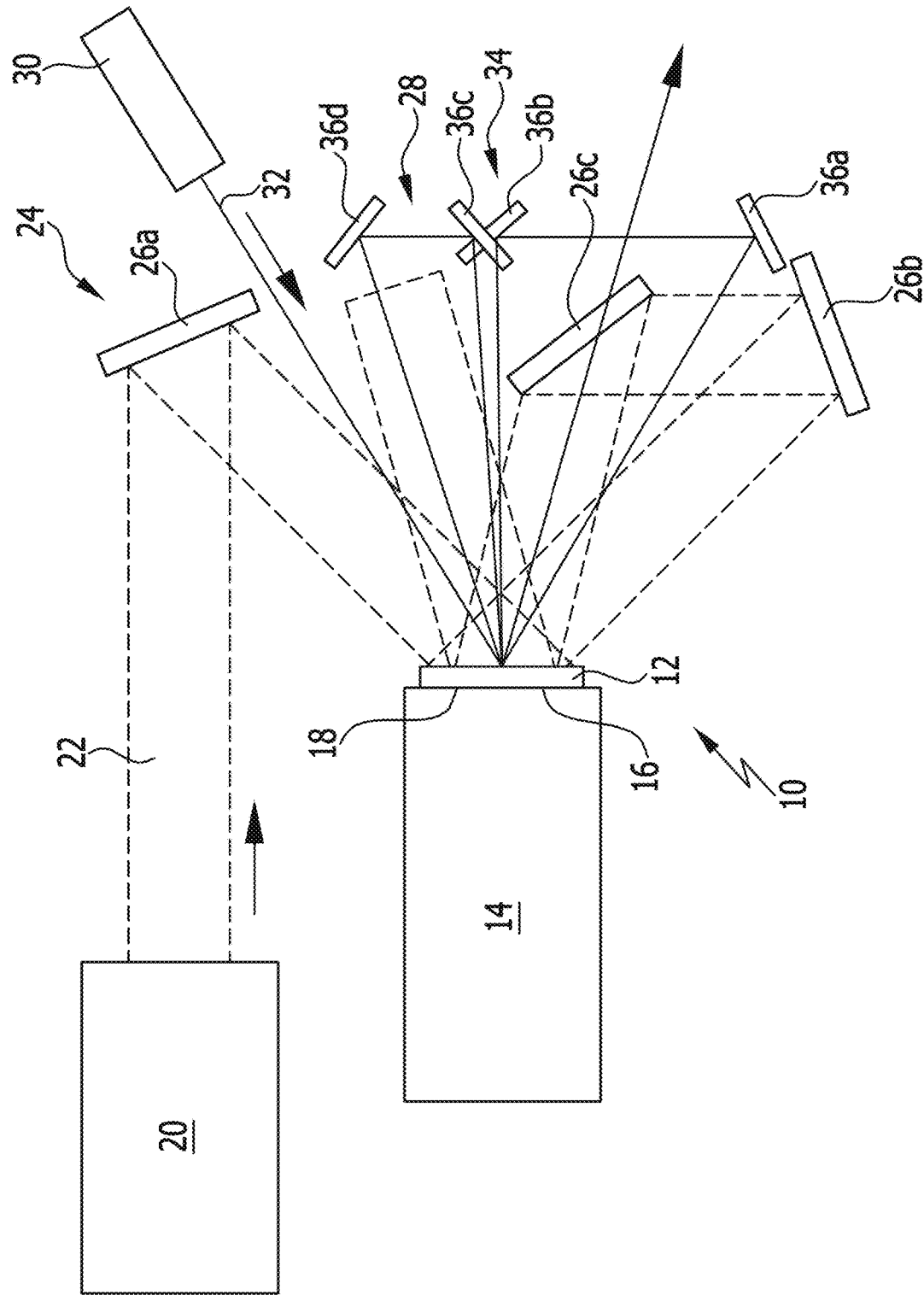

(51) Int. Cl.
*H01S 3/07* (2006.01)
*H01S 3/23* (2006.01)
*H01S 3/094* (2006.01)
*H01S 3/04* (2006.01)

(52) U.S. Cl.
CPC .......... *H01S 3/0621* (2013.01); *H01S 3/0623* (2013.01); *H01S 3/0625* (2013.01); *H01S 3/094084* (2013.01); *H01S 3/2325* (2013.01); *H01S 3/04* (2013.01); *H01S 3/07* (2013.01)

(58) Field of Classification Search
CPC .... H01S 3/2325; H01S 3/0604; H01S 3/0617; H01S 3/07; H01S 3/04
See application file for complete search history.

(56) References Cited

U.S. PATENT DOCUMENTS

| | | | |
|---|---|---|---|
| 5,144,498 A | 9/1992 | Vincent | |
| 5,257,277 A * | 10/1993 | Yagi | H01S 3/0941 372/75 |
| 5,553,088 A * | 9/1996 | Brauch | H01S 3/042 372/34 |
| 6,339,605 B1 | 1/2002 | Vetrovec | |
| 6,373,866 B1 * | 4/2002 | Black | H01S 3/0606 372/100 |
| 6,577,666 B2 | 6/2003 | Erhard et al. | |
| 8,165,182 B2 | 4/2012 | Giesen et al. | |
| 8,441,710 B2 | 5/2013 | Wang et al. | |
| 8,514,906 B1 * | 8/2013 | Murray | H01S 3/0606 372/92 |
| 8,861,563 B2 * | 10/2014 | Kopf | H01S 3/063 372/93 |
| 2001/0040909 A1 | 11/2001 | Erhard et al. | |
| 2002/0057725 A1 * | 5/2002 | Peressini | H01S 3/0941 372/92 |
| 2003/0063884 A1 * | 4/2003 | Smith | H01S 3/063 385/129 |
| 2005/0058173 A1 * | 3/2005 | Vetrovec | H01S 3/042 372/66 |
| 2005/0129081 A1 * | 6/2005 | Erhard | H01S 3/081 372/71 |
| 2005/0265411 A1 * | 12/2005 | Takeuchi | H01S 3/0941 372/39 |
| 2006/0109878 A1 * | 5/2006 | Rothenberg | H01S 3/0606 372/35 |
| 2006/0114961 A1 * | 6/2006 | Manni | H01S 3/0941 372/70 |
| 2006/0165141 A1 * | 7/2006 | Kopf | H01S 3/0941 372/36 |
| 2006/0193362 A1 * | 8/2006 | Kopf | H01S 3/063 372/93 |
| 2007/0110116 A1 * | 5/2007 | Vetrovec | H01S 3/042 372/66 |
| 2008/0080584 A1 * | 4/2008 | Coyle | H01S 3/0606 372/92 |
| 2010/0111121 A1 * | 5/2010 | Takeshita | H01S 3/0604 372/29.01 |
| 2011/0044361 A1 | 2/2011 | Giesen et al. | |
| 2011/0134945 A1 * | 6/2011 | Vidne | H01S 3/0941 372/25 |
| 2011/0243166 A1 | 10/2011 | Manni | |
| 2013/0301117 A1 * | 11/2013 | Zapata | H01S 3/0604 359/342 |
| 2013/0301662 A1 | 11/2013 | Stuart et al. | |
| 2015/0171587 A1 * | 6/2015 | Schad | H01S 3/042 372/36 |
| 2015/0295380 A1 * | 10/2015 | Russbueldt | H01S 3/08059 359/345 |
| 2017/0229835 A1 * | 8/2017 | Manni | H01S 3/0625 |

FOREIGN PATENT DOCUMENTS

| | | | |
|---|---|---|---|
| DE | 4412503 | 10/1995 | |
| DE | 19835107 | 2/2000 | |
| DE | 102008008078 | 7/2009 | |
| DE | 102009021936 | 11/2010 | |
| WO | WO-2011027471 A1 * | 3/2011 | ........... H01S 3/0606 |

OTHER PUBLICATIONS

Neuhaus et al.; Subpicosecond thin-disk laser oscillator with pulse energies of up to 25.9 microjoules by use of an active multipass geometry; Optics Express, vol. 16, No. 25; Dec. 8, 2008; 10 pages.
Schaumann et al.; High energy heavy ion jets emerging from laser plasma generated by long pulse laser beams from the NHELIX laser system at GSI; Laser and Particle Beams; 2005; 10 pages.
Schulz et al.; Pulsed operation of a high average power Yb:YAG thin-disk multipass amplifier; Optics Express, vol. 20, No. 5; Feb. 27, 2012; 6 pages.
Zheng et al.; High Power Quasi-Continuous-Wave Diode-End-Pumped Nd:YAG Slab Amplifier at 1319 nm; Chinese Physics Letters, vol. 30, No. 7; 2013; 6 pages.
Williams et al.; Use of radiation pressure for measurement of high-power laser emission; Optics Letters, vol. 38, Issue 20; 2013; 4 pages.
Erdogan et al; Semrock VersaChrome, The First Widely Tunable Thin-film Optical Filters; Semrock White Paper Series; date unknown; 15 pages.
Skorobogatiy; Linear rotary optical delay lines; Optics Express, vol. 22, No. 10; May 19, 2014; 22 pages.
Urbanek et al.; Femtosecond THz time domain spectroscopy at 36 kHz scan rate using an acousto-optic delay; Applied Physics Letters, vol. 108, Issue 12; 2016; 12 pages.

* cited by examiner

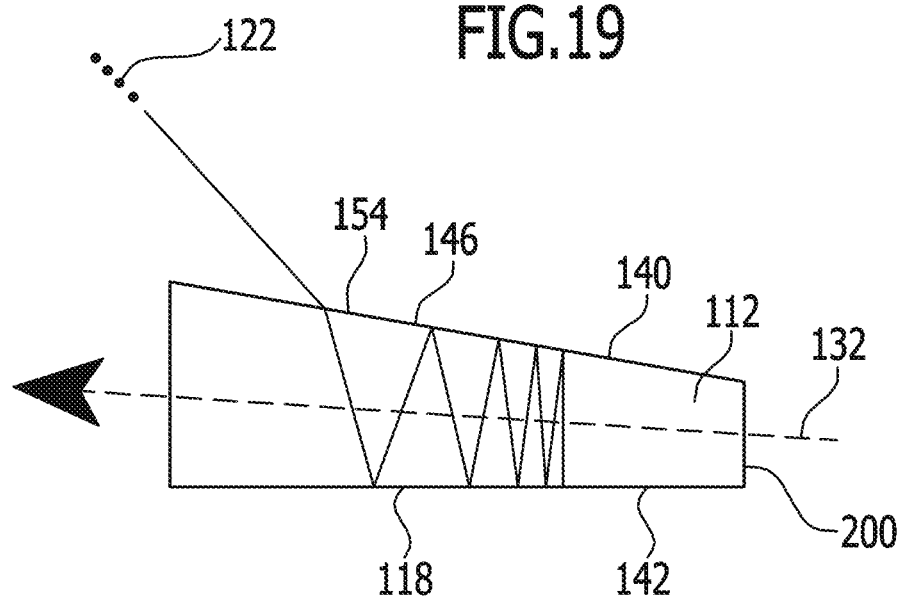
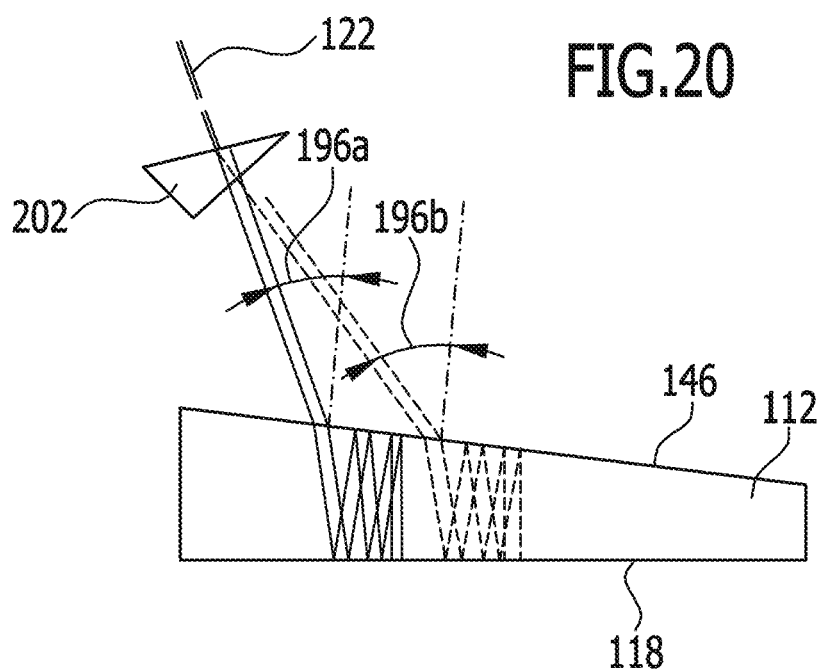

SOLID-STATE LASER GAIN MEDIUM WITH INCLINED REFLECTIVE PLANES FOR PUMP AND SEED RADIATION CONFINEMENT

CROSS-REFERENCE TO RELATED APPLICATIONS

This application is a continuation of international application number PCT/EP2017/060970 filed on May 9, 2017 and claims the benefit of German application number 10 2016 108 474.3 filed on May 9, 2016, which are incorporated herein by reference in their entirety and for all purposes.

FIELD OF THE INVENTION

The present invention relates to discoidal or cuboidal solid bodies containing at least one laser-active material generally, and more specifically to a discoidal or cuboidal solid body containing at least one laser-active material for a laser amplification system of a solid-state laser, which solid body has an upper side defining an upper side plane and a lower side defining a lower side plane.

Further, the present invention relates to laser amplification systems generally, and more specifically to a laser amplification system comprising at least one discoidal or cuboidal solid body.

The present invention also relates to solid-state lasers generally, and more specifically to a solid-state laser comprising a laser amplification system.

BACKGROUND OF THE INVENTION

Solid bodies of the kind described at the outset, which may be classified as flat and which are used in particular in disc lasers and disc amplifiers, possess several technical advantages in comparison to the use of a three-dimensionally extended medium. In particular, heat management should be noted here.

The length and the thickness, respectively, of such a flat laser-active medium, which the discoidal or cuboidal solid body forms, is not sufficient, however, to ensure a full conversion of the energy stored in the solid body into a laser beam in one single beam pass through the solid body which is optically semipermeable to the laser beam. This also applies accordingly to a pump laser beam and a pump laser radiation field, respectively, for exciting the laser-active material in the solid body. In order to provide a practical, efficient system, it is thus necessary to lengthen an optical path in the laser-active medium with additional means.

It is hereby a possibility to achieve a high number of passes of a radiation field in the solid body of a disc laser by way of the quality of the resonator of the laser. The pump laser radiation field is hereby reflected back to the solid body multiple times by means of a mirror arrangement, in order to ensure a sufficiently high absorption.

In laser amplification systems which work with a discoidal or cuboidal solid body containing at least one laser-active material, the described principle with which the pump laser radiation field is reflected back to the solid body multiple times is conferred onto the already amplified laser beam and the laser radiation field, respectively, in order to achieve a sufficiently high amplification. A mirror arrangement, in turn, images the laser radiation field onto the discoidal or cuboidal solid body multiple times in order to achieve a renewed amplification upon each further imaging and upon each further pass through the solid body. Here too, a high expenditure is required in connection with the setup of the mirror arrangement. This also requires a not negligible spatial volume and likewise has a not negligible weight, which is adverse for applications in outer space.

Laser amplification systems of the kind described are known, e.g., from DE 43 44 227 A1 and DE 198 35 107 A1.

In order to increase an interaction length for the radiation field passing through the solid body, so-called slab lasers and slab amplifiers, respectively, are known in which the radiation field is input coupled into the solid body through a narrow edge running transverse to the upper or lower side, in particular perpendicular to one of the same, for exciting the laser-active material. However, in the case of such a lateral input coupling, the radiation field must be relatively strongly focused.

SUMMARY OF THE INVENTION

In a first aspect of the invention, a discoidal or cuboidal solid body for a laser amplification system of a solid-state laser is proposed. Said solid body contains at least one laser-active material, has an upper side defining an upper side plane and a lower side defining a lower side plane. The upper side plane and the lower side plane are inclined in relation to each other and enclose an angle of inclination. The lower side is provided with a first reflective coating. The upper side is provided with a second reflective coating, and at least one of the upper side and the lower side has at least one optical input coupling opening for input coupling at least one of a seed laser radiation field and a pump laser radiation field into the solid body between the first and the second reflective coating.

In a second aspect of the invention, a laser amplification system comprises at least one discoidal or cuboidal solid body. Said solid body contains at least one laser-active material, has an upper side defining an upper side plane and a lower side defining a lower side plane. The upper side plane and the lower side plane are inclined in relation to each other and enclose an angle of inclination. The lower side is provided with a first reflective coating. The upper side is provided with a second reflective coating, and at least one of the upper side and the lower side has at least one optical input coupling opening for input coupling at least one of a seed laser radiation field and a pump laser radiation field into the solid body between the first and the second reflective coating.

In a third aspect of the invention, a solid-state laser comprises a laser amplification system. Said laser amplification system comprises at least one discoidal or cuboidal solid body. Said solid body contains at least one laser-active material, has an upper side defining an upper side plane and a lower side defining a lower side plane. The upper side plane and the lower side plane are inclined in relation to each other and enclose an angle of inclination. The lower side is provided with a first reflective coating. The upper side is provided with a second reflective coating, and at least one of the upper side and the lower side has at least one optical input coupling opening for input coupling at least one of a seed laser radiation field and a pump laser radiation field into the solid body between the first and the second reflective coating.

BRIEF DESCRIPTION OF THE DRAWING FIGURES

Figure 2:
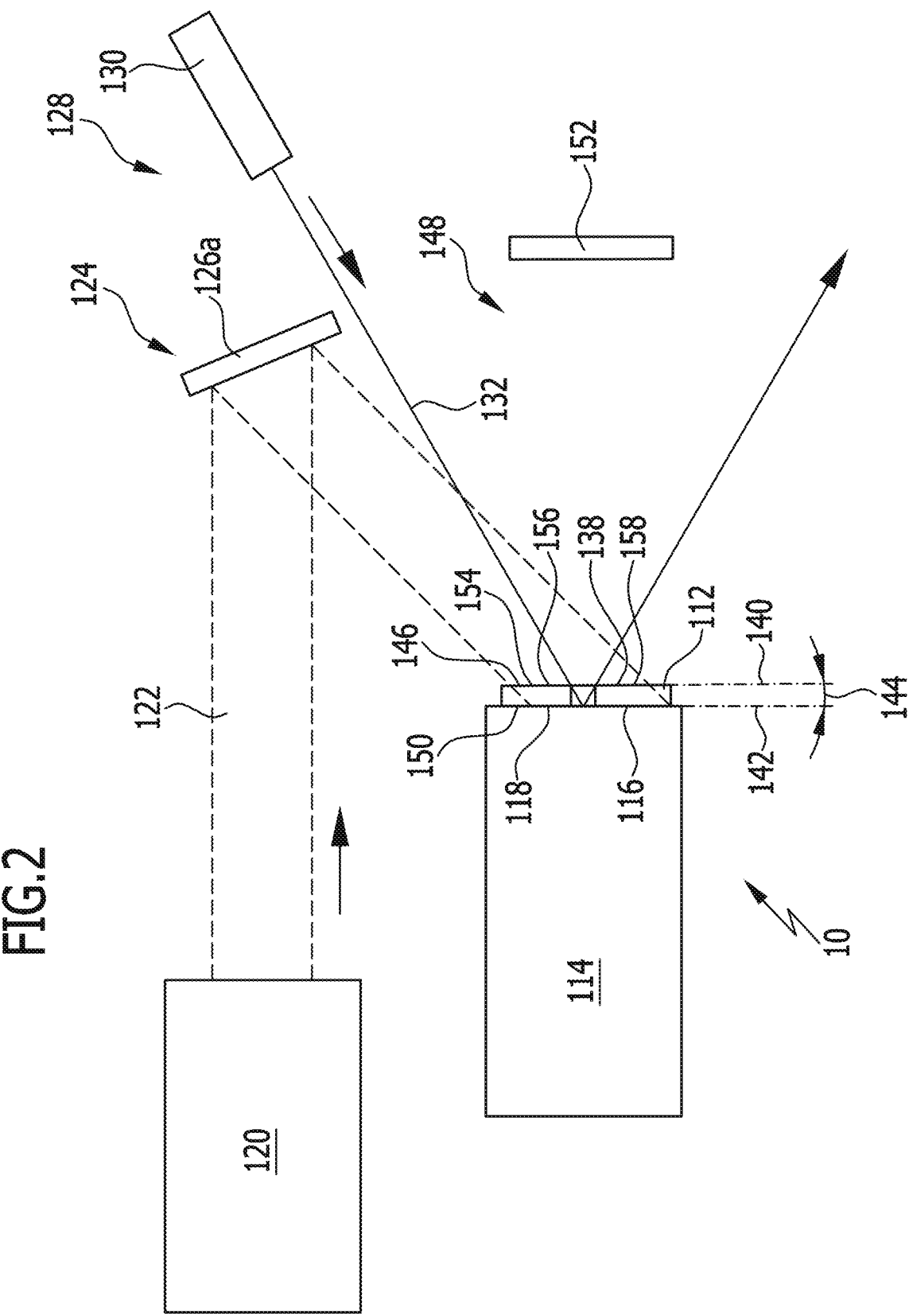
Figure 3:
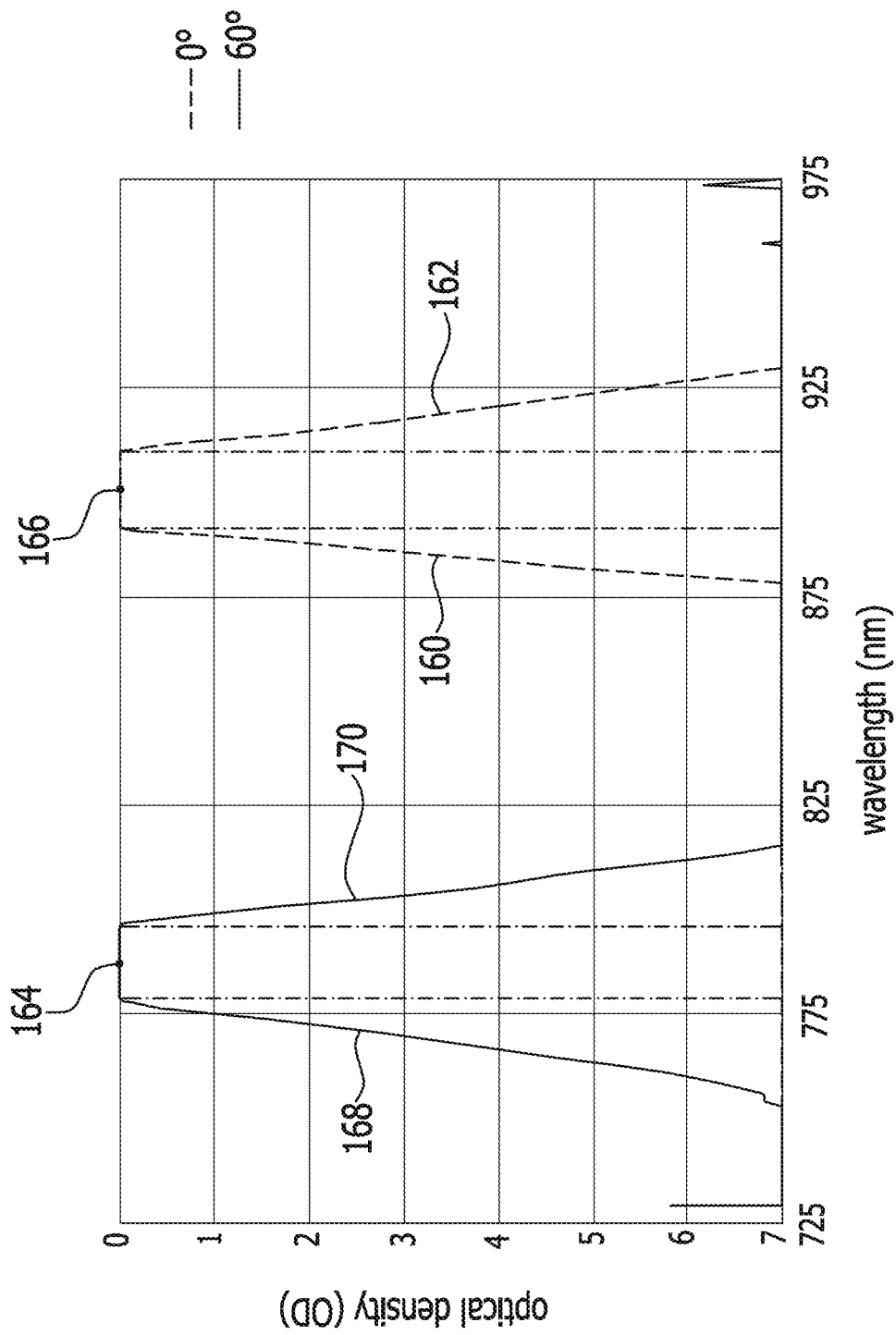
Figure 4:
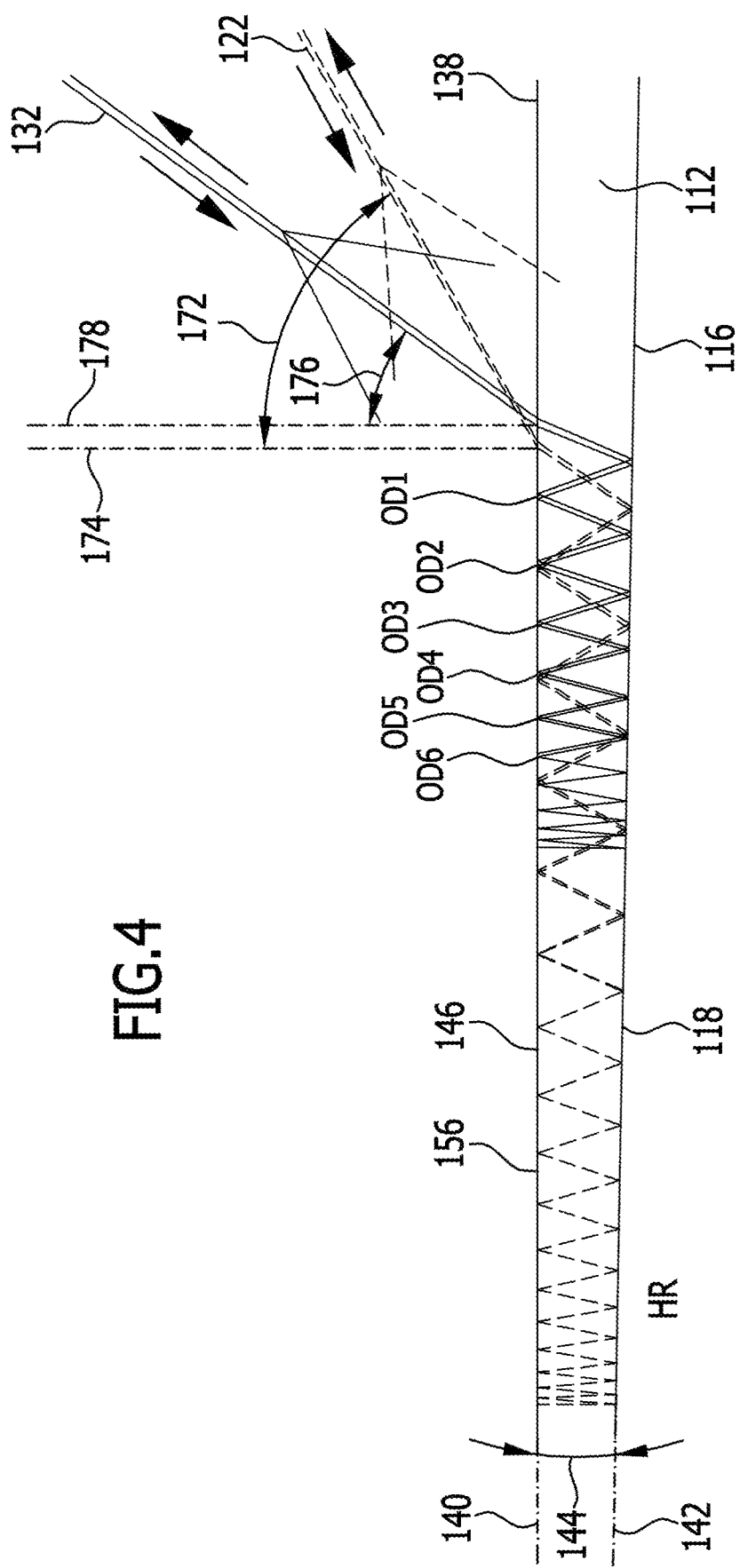
Figure 5:
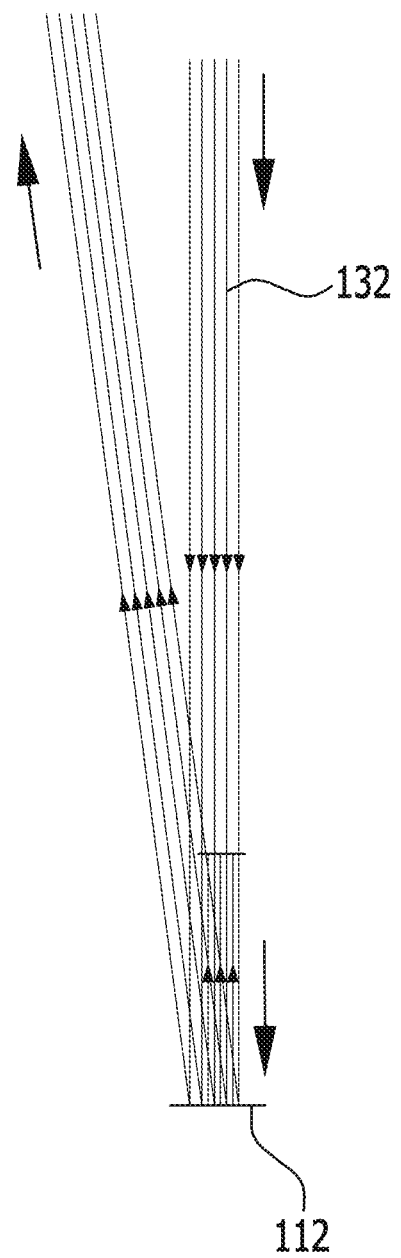
Figure 6:
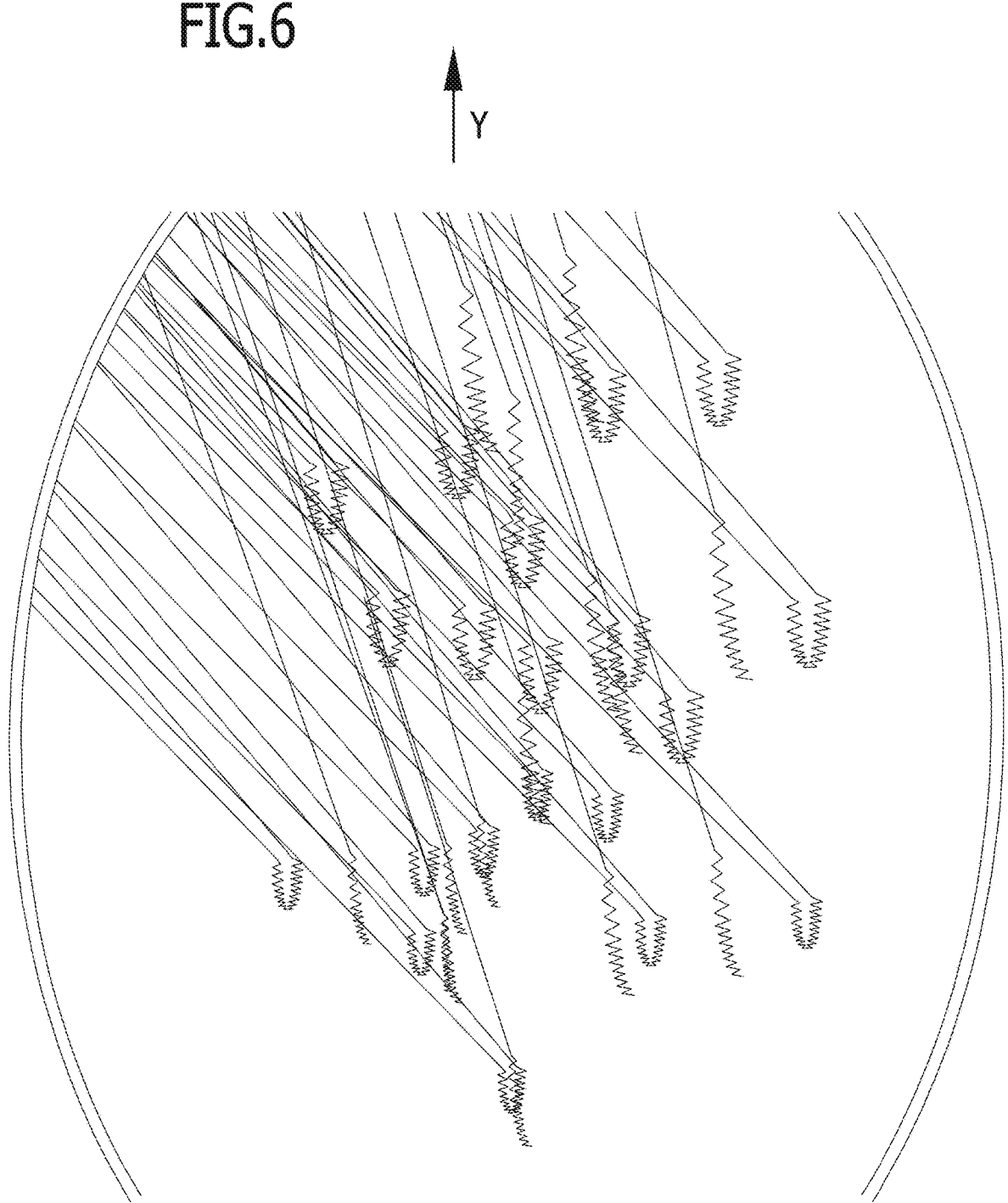

The foregoing summary and the following description may be better understood in conjunction with the drawing figures, of which:

FIG. 1: shows a schematic depiction of a laser amplification system of a solid-state laser in accordance with the prior art;

FIG. 2: shows a schematic depiction of a laser amplification system of a solid-state laser in accordance with an embodiment;

FIG. 3: shows a schematic depiction of the optical density of the coating of a VersaChrome® TBP01-900/11-26×36 filter for angles of incidence of 0° and 60°;

FIG. 4: shows a schematic depiction of multiple reflections in a coated solid body for a seed laser beam and a pump laser beam;

FIG. 5: shows a schematic depiction of a main beam path from the y-direction;

FIG. 6: shows a view of the main beam path depicted in FIG. 5, rotated by 45° about the y-axis.

Figure 7:
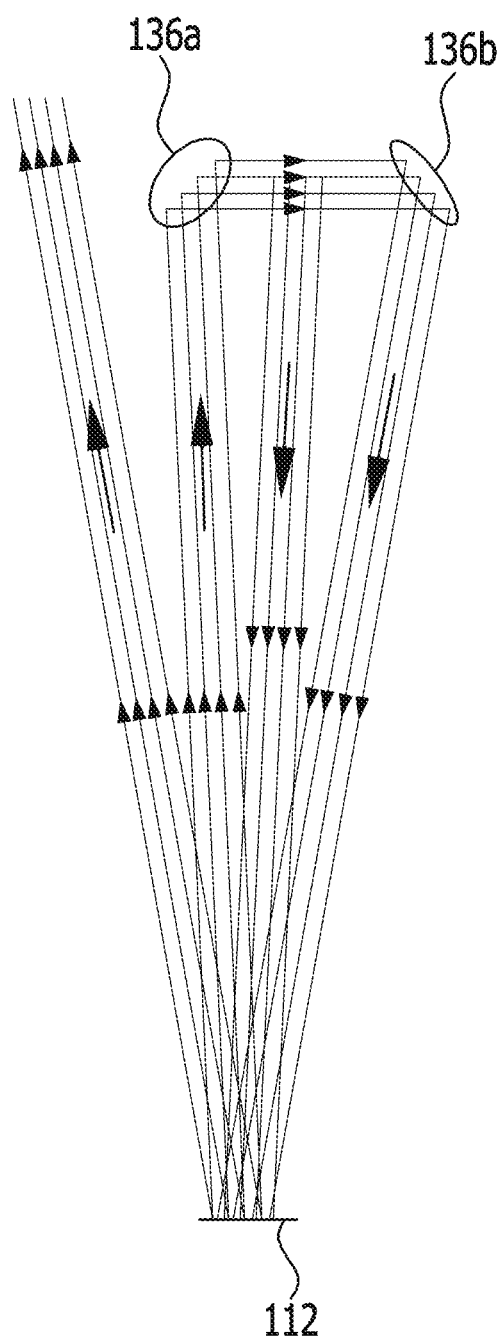
Figure 8:
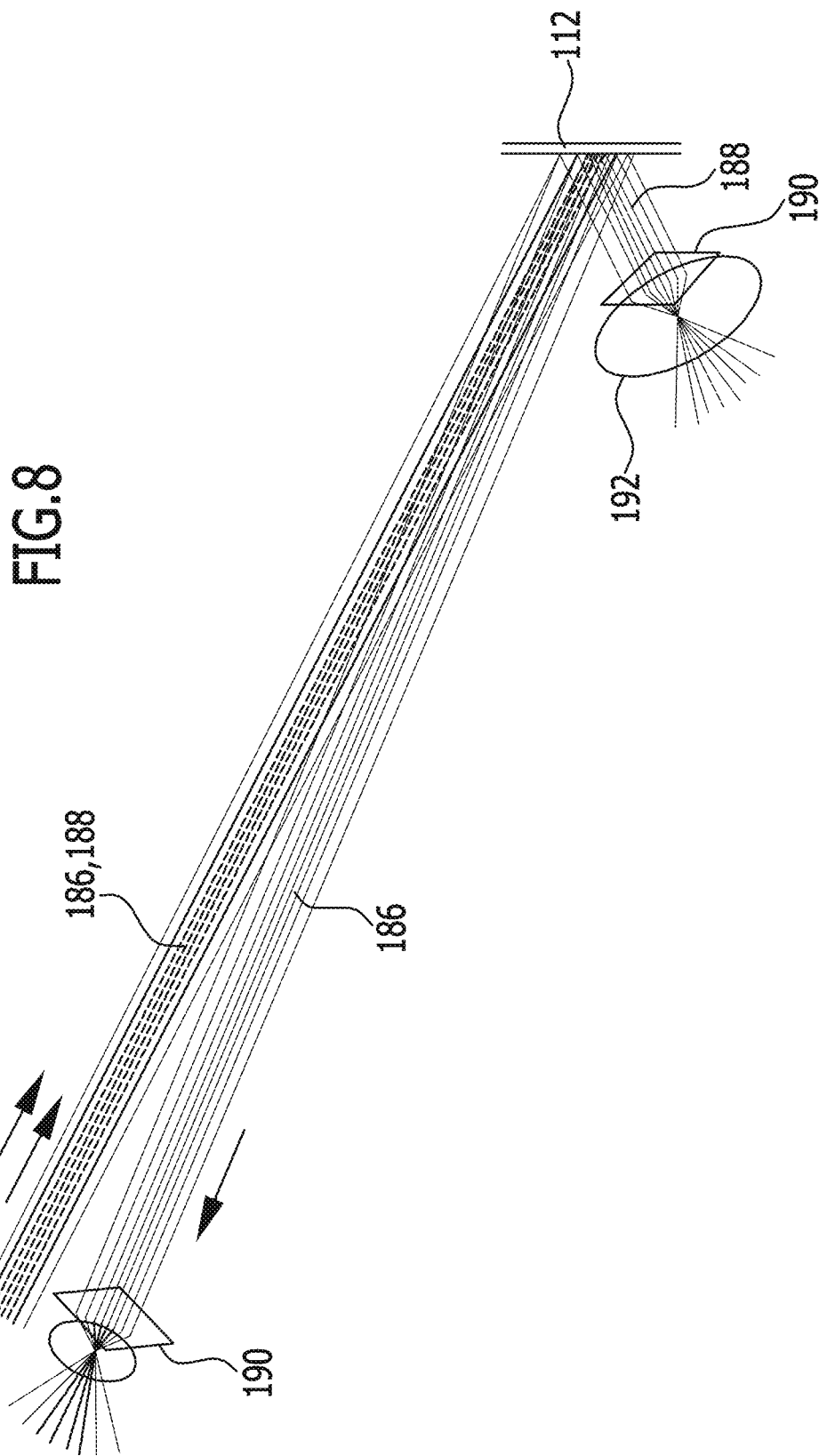
Figure 9:
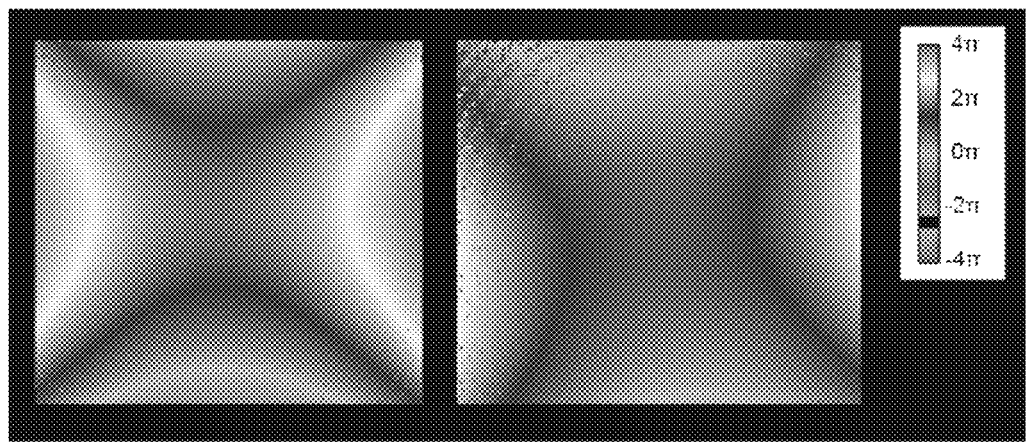
Figure 10:
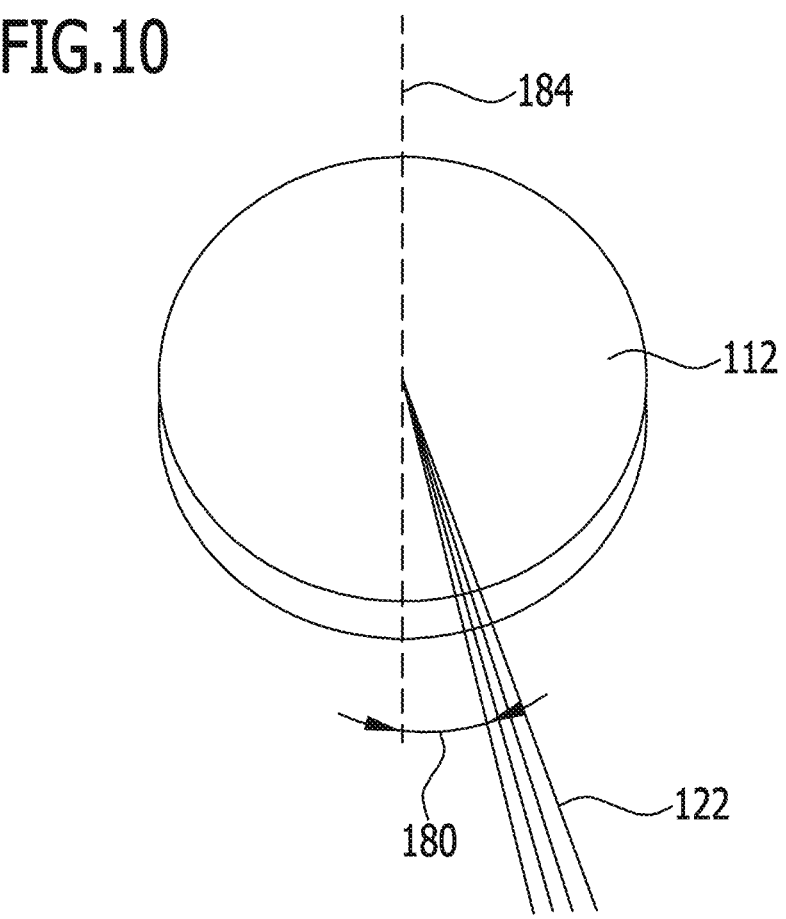
Figure 11:
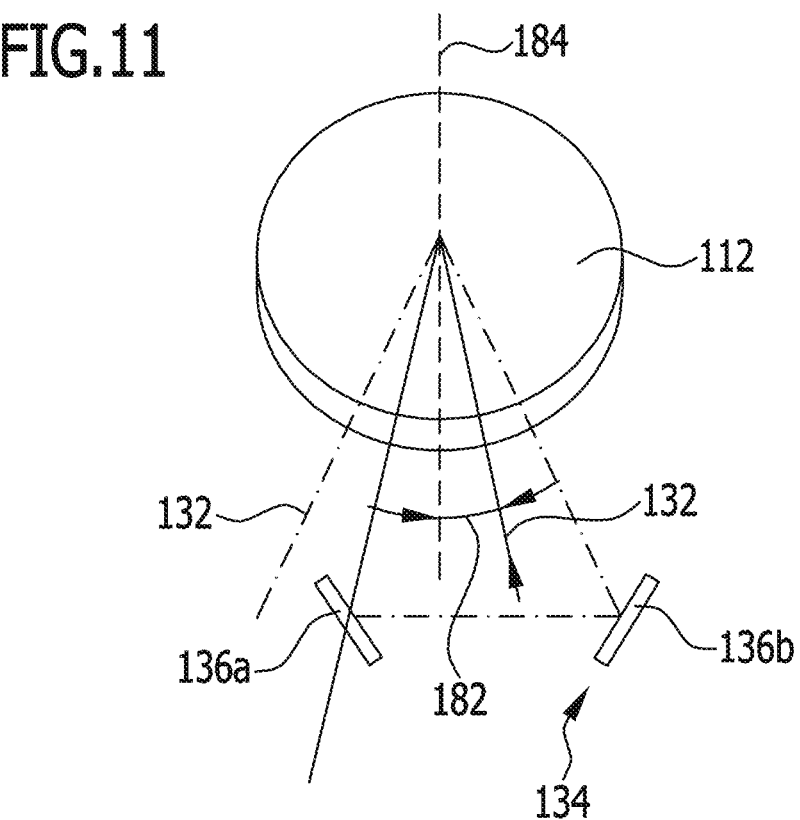
Figure 12:
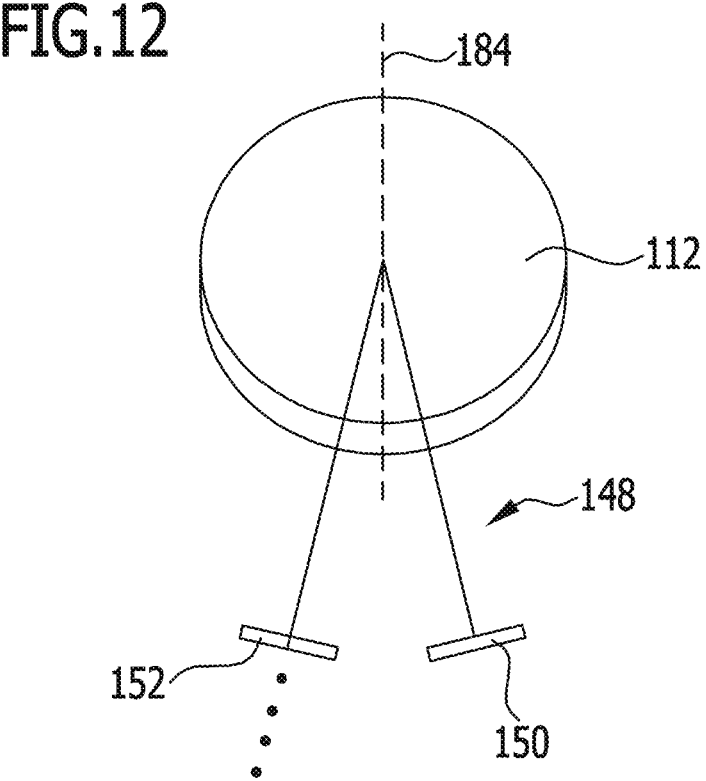
Figure 13:
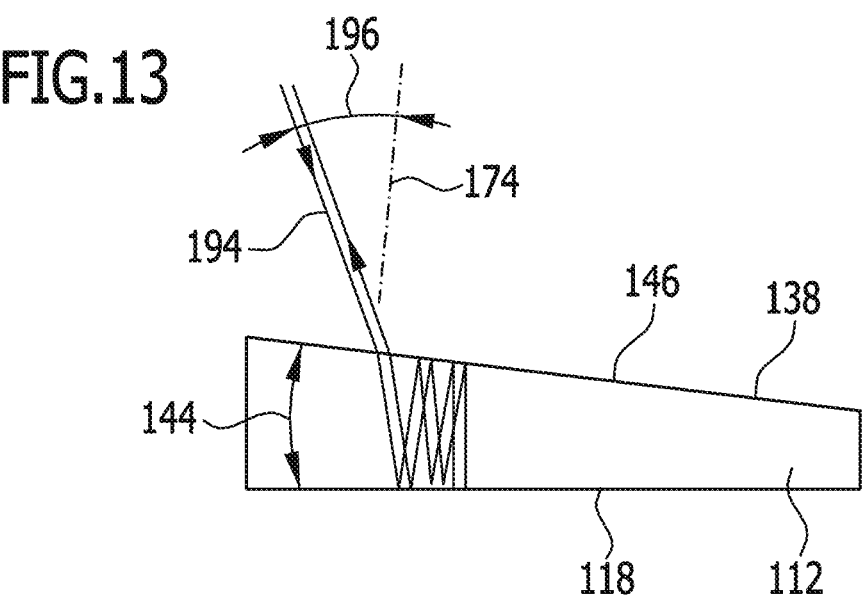
Figure 14:
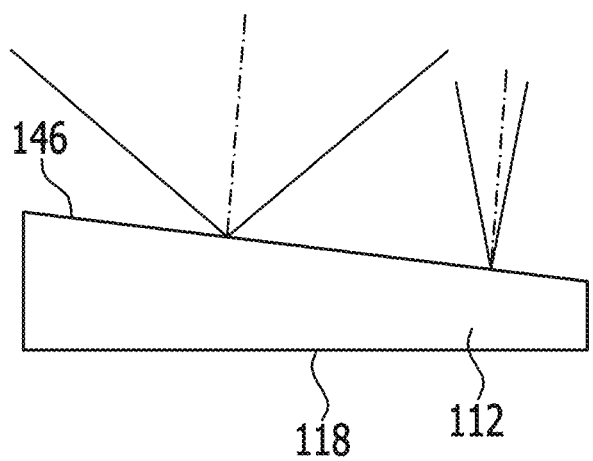
Figure 15:
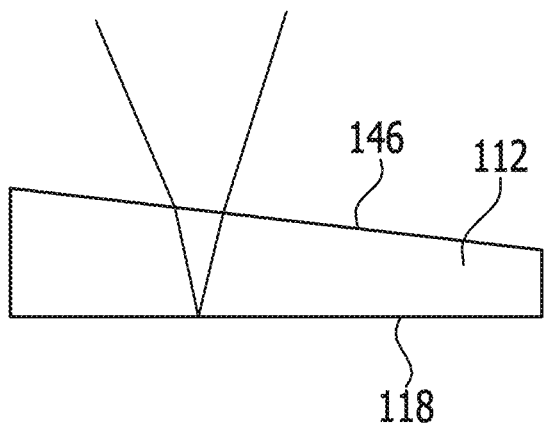
Figure 16:
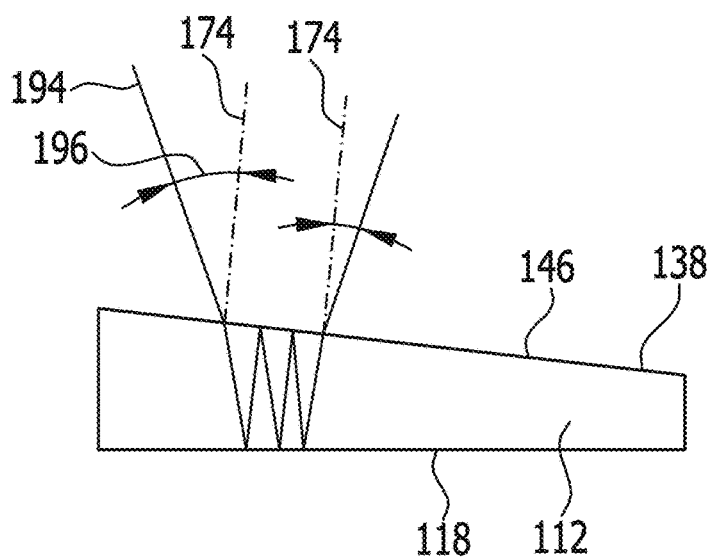
Figure 17:
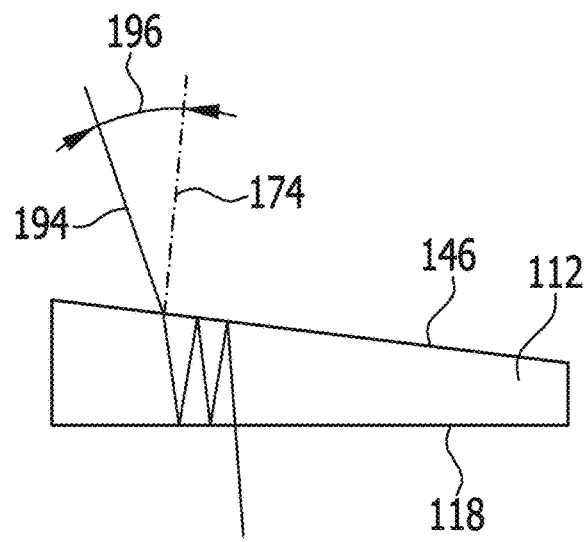
Figure 18:
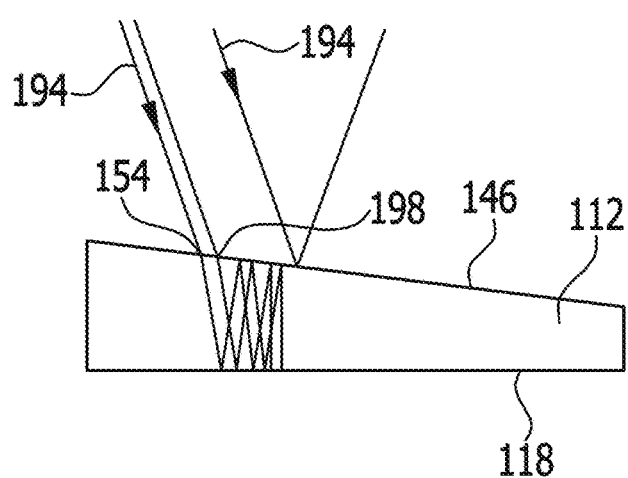
Figure 21:
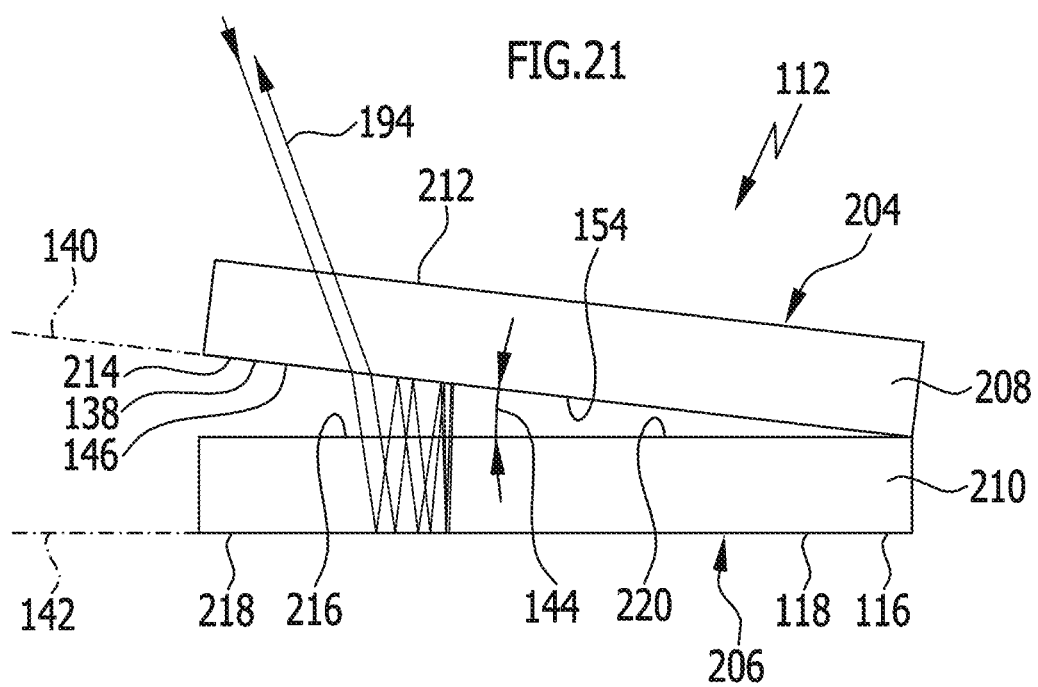
Figure 22:
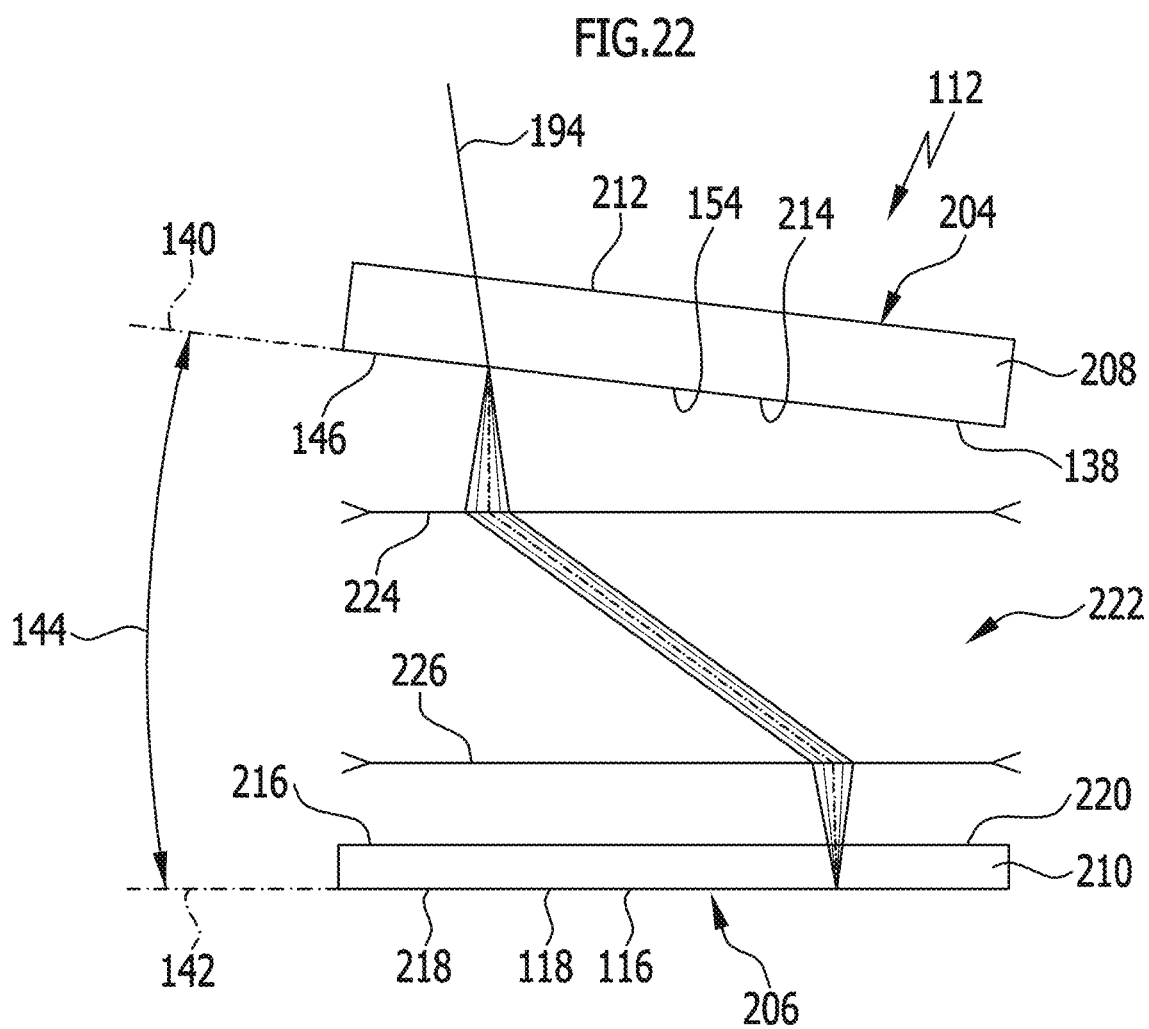

FIG. 7: shows a schematic depiction of a main beam path of a double-pass arrangement;

FIG. 8: shows a schematic depiction of the comparison of a spherical deformation of the solid body for single or multiple reflection of a radiation field in the solid body;

FIG. 9: shows a grey-scale depiction of higher order phase errors;

FIG. 10: shows a schematic depiction of the impingement of a pump laser radiation field on the solid body;

FIG. 11: shows a schematic depiction of a double-pass arrangement for the amplification of the laser beam by a seed beam;

FIG. 12: shows a schematic arrangement of the solid body in a laser resonator;

FIG. 13: shows a schematic sectional view of a solid body with correct angle of incidence of a radiation field with a bandpass as a first coating and a highly reflective coating as a second coating;

FIG. 14: shows a view similar to FIG. 13, but with too flat and too steep angles of impingement of the radiation field on the solid body;

FIG. 15: shows a view like in FIG. 13, but with an angle of incidence that enables a direct reemergence of the radiation field from the solid body;

FIG. 16: shows a schematic sectional view of a solid body with a first coating in the form of a double bandpass filter and a bottom coating in the form of a highly reflective coating with incident and outgoing radiation field;

FIG. 17: shows a schematic sectional view of a solid body which has both a first and a second coating in the form of bandpass filter, with incident and outgoing radiation field;

FIG. 18: shows a schematic depiction of a solid body with an input coupling opening in the form of an uncoated surface region of the upper side defining an input coupling region;

FIG. 19: shows a sectional view through a solid body which is provided with coatings analogous to the solid body in FIG. 13, wherein a seed radiation field is input coupled into the solid body through a narrow edge of the solid body and is pumped through the first coating;

FIG. 20: shows a schematic depiction of a solid body with a first coating in the form of a bandpass filter and a second coating in the form of a highly reflective coating, wherein a non-monochromatic pump light source is split by means of a dispersive element and the pump laser radiation field thus split is input coupled into the solid body dependent on wavelength at different angles of incidence;

FIG. 21: shows a schematic depiction of a further embodiment of a solid body being of a multi-part configuration; and FIG. 22: shows a schematic depiction of a further embodiment of a two-part solid body.

DETAILED DESCRIPTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a discoidal or cuboidal solid body for a laser amplification system of a solid-state laser, which solid body contains at least one laser-active material, has an upper side defining an upper side plane and a lower side defining a lower side plane, wherein the upper side plane and the lower side plane are inclined in relation to each other and enclose an angle of inclination, wherein the lower side is provided with a first reflective coating, wherein the upper side is provided with a second reflective coating, and wherein at least one of the upper side and the lower side has at least one optical input coupling opening for input coupling at least one of a seed laser radiation field and a pump laser radiation field into the solid body between the first and the second reflective coating.

With the proposed further-developed solid body, it is possible to achieve multiple passes of a radiation field, in particular a seed laser radiation field and/or a pump laser radiation field, in a simple manner, namely through multiple reflections at the first reflective coating and at the second reflective coating. The radiation field thus remains for the multiple passes, namely more than one forward and return pass through the solid body, in the solid body between the upper and lower side thereof. The radiation field is thus practically trapped between the reflective coating of the upper side and the reflective coating of the lower side and is reflected back and forth multiple times. Depending on the selected angle of inclination, it is thus in particular possible in the case of a very thin solid body to laterally offset a radiation field, having a diameter of several millimeters, only by a fraction of its own diameter upon each pass, such that after each pass, nearly the same volume of the solid body is traversed again. An input coupling opening is to be understood here in particular as each opening which transmits the radiation field, i.e. enables an entry thereof into the solid body. In particular, not only a spatial opening is to be understood here, but also an optical opening which lets the radiation field penetrate into the solid body under certain conditions, for example for a certain wavelength or a certain wavelength range at a certain angle of incident or range of angles of incidence and/or depending of a polarization of the radiation field. In particular the last mentioned optional dependencies enable selectively defining an opening for a radiation field for the entire upper side and/or the entire lower side, such that an optimal focusing of the radiation field to a certain region of the solid body is not necessary, e.g., an input coupling opening which is formed by an uncoated surface region of the upper side or the lower side of the solid body, which is therefore free of a reflective coating. As a result of the proposed further development of the solid body, the extensive optical arrangements known from the prior art, in particular of mirrors, may thus be avoided. This simplifies, for one, the setup of the laser amplification system, because mirrors may be dispensed with, which then also do not need to be adjusted. For another, significant costs are saved and also weight of the laser amplification system, relevant in particular for outer space applications of laser systems, because components may be dispensed with which until now were considered indispensable. The solid body may in particular be integrally formed or be of multi-part configuration. Discoidal or cuboidal configuration is then to be understood in particular in the case of a two- or multi-part configuration of the solid body such that the parts forming the solid body are each of discoidal or cuboidal configuration.

It is favorable if the solid body is integrally formed. A particularly capable arrangement, for example for forming a laser amplification system, may thus be realized. In addition, an integrally formed solid body may also have a higher thermal stability and be less susceptible to vibrations than a solid body formed as two or multiple parts.

It is advantageous if the solid body is of two- or multi-part configuration. Two-part or multi-part means in this sense in particular that the solid body is formed of two mutually separate or separable parts, which are therefore not integrally formed parts, subsequently also referred to as solid body elements. In this way, the two reflective coatings may each be arranged or formed on two mutually separate parts of the solid body. Said coatings may thus in particular be arranged at any spacing from each other. In particular, the two solid body elements must not be formed of the same material. Together, though, they form the solid body, also referred to as solid body element arrangement. As a result of a two- or multi-part configuration of the solid body, in particular a geometric complexity of the components thereof, that is of the solid body elements, may be reduced.

The solid body favorably comprises at least one first solid body element and at least one second solid body element. In particular, one first and one second solid body element may be provided. For example, they may be configured in the form of plane-parallel discs or plates, which are arranged or formed inclined relative to each other by the angle of inclination.

Preferably at least one of the at least two solid body elements contains the laser-active material. In particular, the at least one second solid body element may contain the laser-active material. For example, the at least one first solid body element serves exclusively as a substrate for the first or the second reflective coating.

It may be further favorable if at least one of the at least two solid body elements is formed of a material translucent to the seed laser radiation field and/or the pump laser radiation field, in particular of glass.

It is favorable if the at least one first solid body element and the at least one second solid body element are configured plane-parallel. The angle of inclination between the upper side and the lower side of the solid body may thus be arbitrarily adjusted in a simple manner. Plane-parallel solid body elements may additionally be produced in a particularly simple manner.

In accordance with a further preferred embodiment, provision may be made for the at least one first solid body element to have a first upper side and a first lower side, for the at least one second solid body element to have a second upper side and a second lower side, for the first lower side and the second upper side to be arranged or formed facing each other, and for the first lower side to form the upper side defining the upper side plane, and for the second lower side to form the lower side defining the lower side plane. Alternatively, the first upper side may also form the upper side defining the upper side plane. With two solid body elements, four side faces may be formed, for example, which may be coated in a desired manner, i.e. in particular each one side face of one of the two solid body elements.

Advantageously, the second upper side of the at least one second solid body element is provided with an anti-reflection layer. An undesired reflection of the seed laser radiation field and/or the pump laser radiation field at the second upper side may thus be effectively prevented, and, respectively, the penetration of the seed laser radiation field and/or the pump laser radiation field into the at least one second solid body element is thus facilitated.

It is favorable if an imaging device is arranged or formed between the at least one first solid body element and the at least one second solid body element. In particular a distance between the at least two solid body elements from which the solid body is formed, and thus quasi a free light path, may be bridged by the imaging device.

The imaging device preferably comprises at least two lenses. An imaging device of that kind may be provided in a cost-efficient manner and with high precision.

It may further be favorable if the imaging device is configured in the form of a 4f-imaging device or a relay optic. It is thus in particular possible to image the at least one first solid body element into the at least one second solid body element which contains the laser-active material. In this way, a spacing of the two boundary faces of the solid body, which each are arranged or formed on a side face of one of the at least two solid body elements, may be virtually greatly reduced. A 4f-imaging device enables in particular enlarging a useable surface of the solid body.

It is advantageous if the first reflective coating is configured in the form of a highly reflective coating or in the form of a wavelength- and/or angle of incidence-dependent reflective coating. If the coating is highly reflective, the optical input coupling opening may be defined in particular by a surface region of the upper side or the lower side which is not provided with the highly reflective coating. If, however, a reflection of the coating is wavelength- and angle of incidence-dependent, then in particular the entire upper side and/or the entire lower side of the solid body may be used for input coupling a radiation field. This has advantages insofar as substantially the entire surface defined by the upper side or by the lower side may be used for input coupling the radiation field, so that substantially the entire solid body is penetrated by the respective radiation field.

Further, it is favorable if the second reflective coating is configured in the form of a highly reflective coating or in the form of a wavelength- and/or angle of incidence-dependent reflective coating. Correspondingly, here applies that which was laid out above regarding the different forms of the first reflective coating. In particular, any combinations of highly reflective coatings of wavelength- and/or angle of incidence-dependent reflective coatings on the upper side and the lower side are possible, i.e., for example, a wavelength- and/or angle of incidence-dependent reflective coating on the upper side and a highly reflective coating on the lower side. A reverse arrangement is also conceivable. Further, both coatings may also be configured as highly reflective or both coatings as wavelength- and/or angle of incidence-dependently reflective.

It is favorable if the first and/or the second coating are configured in the form of an angle of incidence-dependent edge filter or a single or double bandpass filter. Coatings of that kind enable in particular input coupling a radiation field into the solid body dependent on an angle of incidence. Thus, for an edge filter above or below a certain wavelength range for a certain angle of incidence, a radiation field may be coupled into the solid body. Due to the upper and lower side of the solid body being inclined relative to each other, the radiation field is somewhat tilted after entering into the solid body and namely always by twice the angle of inclination between successive reflections. As a result, the angle at which the radiation field impinges on the coatings changes after each reflection in the interior of the solid body. If an entry condition for the radiation field into the solid body at the angle of incidence from the outside is fulfilled, then the radiation field remains trapped in the solid body if, after the first internal back reflection in the solid body, the entry or exit condition, respectively, is no longer fulfilled. Ideally, the exit condition for the radiation field is already no longer fulfilled after one inner reflection in the solid body, so that a pass at the coating, which defines the input coupling opening at the outer angle of incidence, is no longer possible for the radiation field. Rather, the radiation field is now predominantly reflected back, in particular entirely. In other words, an optical density of the coating for the radiation field changes dependent on an angle at which the radiation field impinges on the coating. A radiation field may thus be selectively input coupled into the solid body and trapped therein.

It is favorable if the edge filter or the single or double bandpass filter have an edge steepness which is at least 1 OD/3 nm. The edge steepness is preferably in a range of about 1 OD/3 nm to about 3 OD/3 nm. In particular, the edge steepness is about 2 OD/3 nm. An optical density hereby corresponds in particular to 10 dB. With a minimal edge steepness as specified, a radiation field may be coupled into the solid body at a certain angle of incidence and be trapped therein in the described manner. The greater the value for the edge steepness is, the smaller the losses when input coupling the radiation field, for example by reflection on an outer surface of the upper or lower side or by a partial transmission of the radiation field through the first or the second coating out of the solid body. In principle, it is desirable to provide the edge steepness as great as possible.

The solid body is particularly efficiently implementable if the edge filter or the single or double bandpass filter have a high extinction ratio. In particular, an optical density of the filters is at least 3. Further preferably, the optical density of the filters is at least 6.

The first and/or second coating are favorably configured in the form of a dichroic coating. Dichroic layers have in particular the quality that their reflectivity depends in particular on angle of incidence, wavelength, and polarization of the light. In particular, dichroic layers may also be configured in such a way that they have a bandpass quality and a transmissivity that is adjustable to the angle of incidence, nearly independently of polarization.

The first and/or second coating are advantageously configured to be polarization-independent. This has in particular the advantage that a reflectivity of the first and/or second coating depends merely on the angle of incidence and the wavelength of the radiation field.

In order to obtain a number of multiple reflections in the solid body that is as high as possible, it is advantageous if the angle of inclination is in a range of about 0° to about 3°. Further preferably, the angle of inclination is in a range of about 0.5° to about 1.5°. In particular, it may be about 1°. The smaller the angle of inclination is, the greater the number of possible multiple reflections in the solid body is. Depending on the characteristics of the first and/or second coating, in particular an edge steepness thereof, a greater angle of inclination may however be advantageous in order to couple a greatest possible amount of the radiation field into the solid body and trap it therein.

It is advantageous if the solid body has a thickness, which corresponds to a distance between the upper side and the lower side, in a range of about 100 µm to about 1000 µm. In particular, the thickness may be in a range of about 200 µm to about 500 µm. Due to the inclination between the upper side and the lower side, a thickness of the solid body is not constant. In particular, a minimal thickness of the solid body and a maximal thickness of the solid body may be in the specified ranges or be defined thereby.

A wavelength- and angle of incidence-dependent coating of the upper and/or lower side may be dispensed with in particular if the at least one optical input coupling opening is configured in the form of a coating-free input coupling region on the upper side or the lower side of the solid body. Thus the upper side and the lower side may be provided with a highly reflective coating, except for the input coupling region. This enables in particular input coupling a radiation field into the solid body through the input coupling opening configured as such. If the input coupling region is sufficiently small, after a back reflection on the opposite side of the solid body, the radiation field can no longer exit the solid body, as it is reflected back again into the solid body at the highly reflective coating next to the coating-free input coupling region. Coating-free hereby refers exclusively to the first or second coating. However, the coating-free input coupling region may optionally be provided with an anti-reflection coating.

It is further favorable if the at least one optical input coupling opening is configured in the form of a wavelength-dependent and angle of incidence-dependent input coupling opening for a pump laser radiation field and/or a seed laser radiation field. Such an input coupling opening may extend in particular over an entire surface of the solid body, which surface is defined by the upper side of the latter or the lower side of the latter. In particular, radiation fields with a large radiation field diameter may thus be input coupled into the solid body in a simple manner and be trapped therein.

The first reflective coating and/or the second reflective coating preferably define or comprise the at least one wavelength-dependent and angle of incidence-dependent input coupling opening. The input coupling opening may thus be defined by the respective coating. The input coupling opening also forms in particular the output coupling opening, in order to enable, under appropriate conditions, i.e. dependent on the wavelength and the angle of incidence on the coating in the interior of the solid body, an exit of the radiation field therefrom.

A laser-active material may be introduced into the solid body in a simple manner if the solid body is configured in the form of a crystal or is formed of glass. The solid body may thus in particular also form a matrix for the laser-active material.

It is favorable if the crystal is formed of yttrium aluminum garnet or sapphire or of a semiconductor. Crystals of that kind may be doped with laser-active material in a particularly simple and defined manner.

In order to arrange laser-active material in the solid body in a desired quantity and in a defined manner, it is advantageous if the solid body is doped with the laser-active material.

In accordance with a further preferred embodiment, provision may be made for the laser-active material to comprise a chemical element from the group of lanthanides or a transition metal. In particular, it may be ytterbium, neodymium, or erbium, which are preferably doped in yttrium aluminum garnet crystals. Optionally, transition metals in the form of titanium or zirconium may be used as the laser-active material. In particular, a wavelength of the laser may be specified depending on the laser-active material.

It is advantageous if the cuboidal solid body has a first and a second side face, and if the first and second side face run transverse, in particular perpendicular or substantially perpendicular, to the upper side plane and/or to the lower side plane. For example, the first and/or the second side face may define an input coupling opening for a seed laser radiation field. A pump laser radiation field may then optionally be input coupled into the solid body through an optical input coupling opening on the upper side or the lower side. The first and/or second reflective coating of the top and the lower side, respectively, may thus also be used in a solid body which serves for forming a slab laser or a slab laser amplifier.

It is advantageous if the first and/or the second reflective coating are configured in the form of a VersaChrome® TBP01-900/11-26×36 coating or in the form of a LP02-1064RE coating. Such coatings are available, e.g., from the company Semrock Inc.

The present invention further relates to a laser amplification system comprising at least one discoidal or cuboidal solid body, which solid body contains at least one laser-active material, has an upper side defining an upper side plane and a lower side defining a lower side plane, wherein the upper side plane and the lower side plane are inclined in relation to each other and enclose an angle of inclination, wherein the lower side is provided with a first reflective coating, wherein the upper side is provided with a second reflective coating, and wherein at least one of the upper side and the lower side has at least one optical input coupling opening for input coupling at least one of a seed laser radiation field and a pump laser radiation field into the solid body between the first and the second reflective coating.

A laser amplification system with such a solid body then also has the advantages described above in conjunction with preferred embodiments of solid bodies.

The laser amplification system favorably comprises at least one pump laser for generating a pump laser radiation field. With the pump laser radiation field, in particular the laser-active material in the solid body may be excited into a laser-active state.

It is favorable if a wavelength of the pump laser radiation field generated by the pump laser is in a wavelength range of about 300 nm to about 1200 nm. In particular, it may be in a range of about 480 nm to about 580 nm or in a range of about 750 nm to about 850 nm or in a range of about 900 nm to about 1000 nm. It is favorable if the wavelength of the pump laser is about 808 nm or about 532 nm or about 950 nm. Pump lasers with pump laser wavelengths in the specified ranges are outstandingly suited for pumping of powerful disc lasers.

Further, it is advantageous if the laser amplification system comprises a seed laser for generating a seed laser radiation field. Thus in particular a wavelength stability, a beam quality, and a power stability and pulsability, respectively, of a laser may be improved.

In particular for solid bodies with a doping of chemical elements from the group of lanthanides, it is favorable if a wavelength of the seed laser radiation field generated by the seed laser is in a wavelength range of about 500 nm to about 3000 nm. In particular, a seed laser wavelength may be in a range of about 1000 nm to about 1100 nm. The wavelength of the seed laser is preferably about 1030 nm. With this wavelength, in particular a yttrium aluminum garnet crystal doped with ytterbium may be used as a solid body for a solid-state laser.

In accordance with a further preferred embodiment, provision may be made for the pump laser radiation field to be directed to the solid body at a pump laser radiation field angle in relation to a surface normal of the upper side or the lower side, in that the seed laser radiation field is directed to the solid body at a seed laser radiation field angle in relation to a surface normal of the upper side and the lower side, and in that the pump laser radiation field angle and the seed laser radiation field angle are different. As a result, a pump laser radiation field and a seed laser radiation field may be input coupled into the solid body independently of each other in a simple manner. Further, in particular a number of the multiple reflections may also be specified by the angle of incidence, taking into account the angle of inclination between the upper side and the lower side.

The pump laser radiation field angle is favorably larger than the seed laser radiation field angle. Thus a higher number of multiple reflections between the first coating and the second coating may be specified with the pump laser radiation field.

In order to further increase a number of the circulations of the pump laser radiation field in the solid body, it is advantageous if the laser amplification system comprises at least one first deflection mirror arrangement for deflecting the pump laser radiation field exiting the solid body back to the solid body. The pump laser radiation field may be trapped in the solid body as described above. In particular, it may be imaged back to the solid body by the at least one first deflection mirror arrangement if it impinges on the solid body at a suitable angle of incidence, again trapped in said solid body, so that it may pass through the same as a result of a plurality of multiple reflections. In this way, in particular an efficiency of the laser amplification system may be further improved.

The at least one first deflection mirror arrangement preferably comprises at least one first deflection mirror. It may also comprise two, three, or more deflection mirrors with which the pump laser radiation field is able to be deflected back to the solid body after passing multiple times through the same. The first deflection mirror arrangement may in particular be configured in such a way that the pump laser radiation field may be trapped in the solid body multiple times in order to absorb as much of the energy contained in the pump laser radiation field as possible in the solid body.

It is favorable if the laser amplification system comprises at least one second deflection mirror arrangement for deflecting the seed laser radiation field exiting the solid body back to the solid body. With the second mirror arrangement, similar to with the first mirror arrangement and the pump laser radiation field, the seed laser radiation field may be used more efficiently. Thus, it may be trapped in the solid body not only once, but, as the case may be, also multiple times in order to further increase the power of the laser beam.

For forming an efficient solid-state laser, it is advantageous if the solid body is arranged in a resonator.

The resonator favorably comprises an end mirror and an output coupling mirror. The laser beam may thus be amplified in a specific manner and, as required, be output coupled from the resonator in a continuous or pulsed manner.

The end mirror is preferably configured to be highly reflective. In this way, the laser beam cannot leave the resonator through the end mirror.

The laser amplification system may be formed in a particularly simple and compact manner if the end mirror comprises the first reflective coating. The first reflective coating may thus in particular also form the end mirror of the resonator. In particular, the solid body with the first reflective coating may be arranged on a cooling body in order to dissipate the heat emitted by the absorbed energy from the pump laser radiation field and/or from the seed laser radiation field into the solid body.

It may further be favorable if the laser amplification system comprises at least one dispersive optical element for wavelength-dependently expanding or splitting the pump laser radiation field generated by the pump laser and/or the seed laser radiation field generated by the seed laser. With the dispersive optical element, it is in particular possible to expand or split the pump radiation field generated by a non-monochromatic pump light source such that it is possible to collimate different wavelengths in different angles, so that, in principle, an input coupling of a non-monochromatic pump radiation field into the solid body is possible in one step. It may thus be avoided that only a part of the spectrum of the pump light source is able to be trapped in the solid body for exciting the laser-active material. As a result of the dispersive medium, in particular additional mirrors may be dispensed with for deflecting back portions of the spectrum of the pump light source, which are reflected by the solid body, in order to optimize an angle of incidence for the remaining spectrum upon a second incidence of the pump laser radiation field. This may optionally be repeated multiple times with multiple mirrors.

A particularly simple construction of the laser amplification system may be achieved in particular by configuring the dispersive optical element in the form of a prism or an optical grating.

The optical grating is preferably configured in the form of a transmission grating. Alternatively, it may also be configured in the form of a reflection grating.

In accordance with a further preferred embodiment, provision may be made for the pump laser radiation field to be directed to the solid body at a pump laser radiation field rotation angle deviating from 0° in relation to a symmetry plane of the solid body running perpendicular to the upper side plane and to the lower side plane, and/or in that the seed laser radiation field is directed to the solid body at a seed laser radiation field rotation angle deviating from 0° in relation to the symmetry plane. Directing the pump laser radiation field to the solid body at the pump laser radiation field rotation angle and/or the seed laser radiation field at the seed laser radiation field rotation angle has in particular the advantage that the radiation fields are not directed back directly in that direction from which they impinge on the solid body. A spatial separation between incident and outgoing branches of a radiation field is thus possible in a simple manner. Optionally, the pump laser radiation field may be defined by a multitude of pump laser beams.

In order to enable a simple further separation between the pump laser radiation field and the seed laser radiation field, in particular between the radiation fields exiting the solid body, it is favorable if the pump laser radiation field rotation angle and the seed laser radiation field rotation angle are different.

Optional additional optical arrangements like in particular the first and/or the second deflection mirror arrangement may be spatially positioned in a simple manner if the pump laser radiation field rotation angle and/or the seed laser radiation field rotation angle are in a range between 0° and 10°. In particular, they may be in a range of about 4° to about 6°. They are preferably about 5°.

In order to prevent an expansion of the pump laser radiation field as much as possible, it is advantageous if the pump laser radiation field is collimated.

The present invention further relates to a solid-state laser comprising a laser amplification system, said laser amplification system comprises at least one discoidal or cuboidal solid body, which solid body contains at least one laser-active material, has an upper side defining an upper side plane and a lower side defining a lower side plane, wherein the upper side plane and the lower side plane are inclined in relation to each other and enclose an angle of inclination, wherein the lower side is provided with a first reflective coating, wherein the upper side is provided with a second reflective coating, and wherein at least one of the upper side and the lower side has at least one optical input coupling opening for input coupling at least one of a seed laser radiation field and a pump laser radiation field into the solid body between the first and the second reflective coating.

Such a solid-state laser then also has the advantages described in connection with preferred embodiments of laser amplification systems.

Further, the use of a solid-state laser in accordance with the invention for material processing, in particular for cutting, jointing, sintering, and/or engraving, as well as for laser ablative drives and for removal of debris in outer space is proposed.

An embodiment of a solid-state laser, designated as a whole with the reference numeral 10, is schematically depicted in FIG. 1 as it is principally known from the prior art.

A discoidal or cuboidal solid body 12 which contains at least one laser-active material is arranged on a cooling arrangement 14. A rear or lower side 16 of the solid body 12 is provided with a first coating 18 which is configured to be highly reflective. A pump light source in the form of a pump laser 20, which generates a pump radiation field in the form of a pump laser radiation field 22, serves for exciting the laser-active material in the solid body 12.

A first deflection mirror arrangement 24 comprises multiple deflection mirrors 26, namely a deflection mirror 26a, a deflection mirror 26b, and a deflection mirror 26c. The pump laser radiation field 22 generated with the pump laser 20 is deflected to the solid body 12 with the deflection mirror 26a. It passes through the solid body 12 and is reflected at the first coating 18 and re-exits the solid body 12.

The part of the pump laser radiation field 22 which was not absorbed by the solid body 12 strikes the deflection mirror 26b, which deflects the pump laser radiation field 22 to the deflection mirror 26c, which in turn deflects the pump laser radiation field 22, now at a different angle than the deflection mirror 26a, back to the solid body 12.

The pump laser radiation field 22 in turn passes through the solid body 12 twice, wherein it is reflected at the first coating 18.

Of course, the first deflection mirror arrangement 24 may comprise even more deflection mirrors 26 in order to let the pump laser radiation field 22 pass through the solid-state laser 12 even more often.

Multiple passes of the pump laser radiation field 22 through the solid body 12 are necessary, as the solid body 12 would not absorb enough energy to excite the laser-active material with one single pass of the pump laser radiation field 22 due to the small thickness of only about 100 μm to about 1000 μm of the solid body 12.

The solid-state laser 10 comprises a laser amplification system 28 with which in particular the first deflection mirror arrangement 24 and the pump laser 20 are also associated.

The laser amplification system 28 further comprises a seed laser 30 for generating a seed laser radiation field 32. The actual laser activity of the solid body 12 is controlled with the seed laser radiation field 32. A wavelength of the seed laser radiation field 32 specifies the wavelength for the solid-state laser 10 and the radiation emitted thereby.

In order to here, too, achieve a high efficiency, namely in particular for the conversion of laser-active states in the laser-active material, a second deflection mirror arrangement 34 is provided in order to deflect the seed laser radiation field 32 to the solid body 12 multiple times, such that the seed laser radiation field 32 may likewise pass through the solid body 12 multiple times.

The seed laser radiation field 32 generated by the seed laser 30 first impinges on the solid body 12, passes once therethrough, is reflected at the first coating 18 and exits the solid body 12 at an angle of reflection which corresponds to an angle of incidence of the seed laser radiation field 32 impinging on the solid body 12. In the embodiment of the solid-state laser 10 schematically depicted in FIG. 1, four deflection mirrors 36a, 36b, 36c, 36d are provided for example.

After a first double pass through the solid body 12, the seed laser radiation field 32 strikes the deflection mirror 36a which deflects the seed laser radiation field 32 to the deflection mirror 36b. From there, the seed laser radiation field 32 again impinges on the solid body 12 at a different angle of incidence. After a further double pass through the solid body 12, the seed laser radiation field 32 impinges on the deflection mirror 36c which in turn deflects the seed laser radiation field 32 to a further deflection mirror 36d by which the seed laser radiation field 32 is again reflected back to the solid body 12, such that it may again pass through the solid body 12 in the described manner.

As also described for the pump laser 20 and the pump laser radiation field 22 generated thereby, the second deflection mirror arrangement 34 may comprise even more deflection mirrors in order to enable further passes of the seed laser radiation field 32 through the solid body 12.

The structure of the solid-state laser 10 schematically depicted in FIG. 1 is very complex, as it requires a large number of mirrors, which must all be precisely adjusted. In addition, they have a non-negligible mass. This has in particular the disadvantage that when using such a solid-state laser 10 in outer space, large masses need to be transported, which is linked to high costs.

FIG. 2 now shows an embodiment of a solid-state laser 110. It comprises a laser amplification system 128 with a pump laser 120 for generating a pump laser radiation field 122 and a seed laser 130 for generating a seed laser radiation field 132.

The laser amplification system 128 further comprises a solid body 112 with an upper side 138 and a lower side 116. The upper side 138 defines an upper side plane 140, the lower side 116 a lower side plane 142. The upper side plane 140 and the lower side plane 142 run not parallel to each other, but rather enclose between them an angle of inclination 144. The solid body 112 is integrally formed, i.e. formed from one piece.

The lower side 116 is provided with a first coating 118, the upper side 138 with a second coating 146.

Both the first coating 118 and the second coating 146 are configured in the form of reflective coatings. They may be configured in different ways. For example, they may be configured to be highly reflective independent from a wavelength or highly reflective depending on wavelength and/or angle of incidence. Possible variants are discussed in detail in the following.

The solid body 112 is applied to a cooling arrangement 114 in order to dissipate heat arising from the absorption of energy from the pump laser radiation field 122 and the seed laser radiation field 132.

The solid-state laser 110 may further comprise a resonator 148 with an end mirror 150 and an output coupling mirror 152.

Optionally, the laser amplification system 128 may comprise a first deflection mirror arrangement 124, for example with a deflection mirror 126a which deflects the pump laser radiation field 122 to the solid body 112. The first deflection mirror arrangement 124 may comprise further deflection mirrors in order to deflect back the pump laser radiation field 122 multiple times to the solid body 112, similar to the arrangement depicted in FIG. 1. In principle, however, this is not necessary in the solid-state laser 110, as the pump laser radiation field 122 and/or the seed laser radiation field 132 does not pass back and forth through the solid body 112 just once, but multiple times, as is subsequently explained.

This is also achieved in that the pump laser radiation field 122 and/or the seed laser radiation field 132 are trapped, so to speak, in the solid body 112 between the coatings 118 and 146, such that they are reflected back and forth multiple times between the coatings 118 and 146.

For trapping or input coupling the pump laser radiation field 122 and/or the seed laser radiation field 132, the upper side 138 and/or the lower side 116 have at least one optical input coupling opening 154.

In the embodiment schematically depicted in FIG. 2, the input coupling opening 154 is formed by the second coating 146. Said input coupling opening 154 is configured in the form of a wavelength- and angle of incidence-dependent reflective coating 156.

The coating 146 forms a single bandpass filter 158. The characteristics thereof are depicted schematically in FIG. 3. Thus, for the bandpass filter 158, a progression of the optical density of the coating 156 is schematically depicted for an angle of incidence of 0° and for an angle of incidence of 60°. Accordingly, electromagnetic radiation can penetrate the coating 156 in a permeable region 166 for wavelengths of about 890 nm to about 910 nm. An optical density of the coating 156 is 0 in the specified wavelength range for a radiation impinging perpendicular on the coating 156.

An optical density of the coating 156 increases with decreasing wavelength, the optical density of the coating likewise increases with increasing wavelength over 910 nm. Both a short-wave edge 160 and a long-wave edge 162 of the progression of the optical density of the coating has an edge steepness of about 2 OD/3 nm.

If electromagnetic radiation impinges on the coating 156 at an angle of 60°, then it results in the progression depicted to the left in FIG. 3 of the optical density dependent on the wavelength. This results, e.g., in a permeable region 164 of about 775 to 795 nm with an optical density of 0. Here, too, a short-wave edge 168 and a long-wave edge 170 of the optical density progression slope with a steepness of about 2 OD/3 nm.

The characteristic of the coating 156 described for example in connection with FIG. 3 thus enables input coupling electromagnetic radiation of a certain wavelength into the solid body at a given angle of incidence. This may occur, e.g., at a wavelength of 780 nm at an angle of 60° for a coating 156, with the permeability characteristics depicted in FIG. 3.

If the angle at which electromagnetic radiation with a wavelength of 780 nm impinges on the coating 156 becomes smaller or larger, then the optical density of the coating 156 decreases both for smaller and for larger angles. So, if the radiation impinges on the second coating 146 at a different angle after reflection at the first coating, then due to the particular characteristics of the coating 156, the condition may be fulfilled that the permeability condition for the electromagnetic radiation which has entered in the solid body 112 is no longer fulfilled for the angle of incidence with which the radiation impinges on the second coating 146 the second time. If the optical density for the radiation is at the new angle of incidence greater than zero, then the radiation is at least partially reflected at the second coating 146.

This change in the angle of impingement of the radiation on the second coating 146 after a forward and return pass of the radiation through the solid body 112 results due to the upper side 138 and the lower side 116 inclined relative to each other. Due to the law of reflection, after each double pass through the solid body 112, the angle at which the radiation impinges on the second coating 146 is reduced by twice the angle of inclination 144.

This results in the coating 156 overall forming an optical input coupling opening 154 for the pump laser radiation field 122 and/or the seed laser radiation field 132, namely depending on its wavelength and an angle of incidence at which they each impinge on the coating 156 the first time. If, after a forward and return pass through the solid body 112 in which the radiation field is entirely reflected back at the first coating 118, the described condition arises that an optical density of the coating 156 for the angle of impingement of the radiation on the coating 156, which angle is changed by twice the angle of inclination 144, is fulfilled for the respective wavelengths, then the radiation is reflected at the coating 156 with increasing proportions and thus passes through the solid body 112 multiple times.

The number of passes thus depends on the angle of inclination and on the angle of incidence of the radiation.

The input coupling of a pump laser radiation field 122 and a seed laser radiation field 132 into the solid body 112 is depicted for example in FIG. 4.

The pump laser radiation field 122 is directed to the solid body 112 at a pump laser radiation field angle 172 in relation to a surface normal to the upper side 138. A wavelength of the pump laser radiation field 122 is 780 nm. The angle of inclination 144 is 1°. The coating 156 is formed by the coating of a VersaChrome® filter of the company Semrock Inc. with the reference TBP01-900/11-26×36.

A tilting behavior of this coating may be calculated in a known manner in accordance with the following formula:

$$\lambda(\theta) = \lambda(0)\sqrt{1 - \frac{\sin^2(\theta)}{n_{\text{eff}}^2}}$$

$\lambda(\theta)$ is thereby the wavelength at a given angle of incidence, wherein 0° corresponds to a perpendicular incidence on the coating, and $n_{\text{eff}}$ is the effective refractive index of the coating. $\Theta$ is the angle of incidence in relation to the surface normal 174.

The pump laser radiation field 122 enters through the coating 156 into the solid body 112 and is entirely reflected at the first coating 118. It then again impinges on the coating 156 at an angle of 60°−2°=58° and is reflected back at the same in large part in the direction to the first coating 118.

Under consideration of the angle of inclination 144 and the pump laser radiation field angle 172, 33 double reflections of the pump laser radiation field 122 result in the solid body 112.

Under consideration of the reducing angle of impingement of the pump radiation field 122 after each reflection at the first coating 118 to the second coating 146, the pump radiation field 122 travels back practically on the same path and then re-exits the solid body 112 at nearly the same location.

The seed laser radiation field 132 impinges on the coating 156 at a seed laser radiation field angle 176 in relation to a surface normal 178 of the upper side. In the example depicted schematically in FIG. 2, the wavelength of the seed laser radiation field is 845 nm, and the seed laser radiation field angle 176 is 36°.

In an analogous manner as for the pump laser radiation field 122, the seed laser radiation field 132 is trapped in the solid body 112. Here the optical densities are provided schematically after the first six back reflections at the first coating 118.

The first coating 118 concerns a highly reflective coating which is independent of the wavelength and the angle of incidence.

Under consideration of the seed laser radiation field angle 176 which is smaller in comparison to the pump laser radiation field angle 172, 23 double reflections result in the solid body 112.

With suitable coatings, wavelengths of about 951 nm for the pump laser radiation field 122 and of about 1030 nm for the seed laser radiation field 132 may be trapped in the solid body in the described manner. For these wavelengths, for example a coating of the company Semrock Inc. with the reference LP02-1064RE may be used for a solid body 112 which is formed of a yttrium aluminum garnet crystal, which is doped with ytterbium as laser-active material. This coating forms a longpass edge filter which transmits long wavelengths. An angle of inclination 144 for such a system is 0.5°. A central thickness of the wedge-shaped solid body is 200 μm. A pump wavelength of the pump laser 120 is 941 nm, a wavelength of the seed laser radiation field 132 generated by the seed laser 130 is 1030 nm. Both the pump laser radiation field 122 and the seed laser radiation field 132 are P-polarized. The pump laser radiation field angle 172 is 48°, the seed laser radiation field angle 176 is 25°. This results in 26 circulations of the seed laser radiation field 132 in the solid body 112 and 48 circulations of the pump laser radiation field 122. Overall, it results in about 4.5% total losses for the seed laser radiation field 132 if no amplification is considered.

Compared to the coating TBP01-900/11-26×36, the coating LP02-1064RE has the advantage that a transmissivity of the coating is already reduced by multiple optical densities after one circulation, so that secondary beams do not constitute any considerable sources of loss or sources of interference and as a result, a total gain of the system is reduced by only a few percent.

In order to further increase the number of circulations, the angle of inclination 144 must be reduced. The P-polarization of the pump laser radiation field 122 and the seed laser radiation field 132 is a prerequisite for achieving the given amplification and loss values.

In order to counteract the described direct return of the radiation fields 122 and 132, it is possible to slightly rotate the solid body 112, i.e. to rotate the radiation fields at an pump laser radiation field rotation angle 180 or at a seed laser radiation field rotation angle 182 in each case in relation to a symmetry plane 184 running perpendicular to the upper side plane 140 and to the lower side plane 142. For a discoidal solid body 112 with a diameter of 25 mm and an angle of inclination 144 of 1° and a pump laser radiation field rotation angle 180 and a seed laser radiation field rotation angle 183 of 5°, it results in a progression of the radiation fields as schematically depicted in FIGS. 5 and 6.

In these two figures, beams are depicted merely for example which exceed 83% of the power of the seed laser radiation field 132 and 93% of the power of the pump laser radiation field 122.

FIG. 5 shows the beam path in a view from the y-direction. Depicted for example in FIG. 6 is a close-up view of the solid body 112, which view is rotated by 45 degrees in relation to the y-axis.

It is clearly visible in FIG. 5 that the seed laser radiation field 132 exiting the solid body 112 encloses a smaller angle with the incident seed laser radiation field 132 and may thus be easily spatially separated.

A progression of the pump laser radiation field 122 and the seed laser radiation field 132 in the wedge-shaped solid body 112 is schematically depicted in FIG. 6. The progression here follows an arc such that the pump laser radiation field 122 re-exits the solid body 112 at a different angle.

The number of reflections in substantially independent of a position on the solid body. Only a size of the arcuate progression and thus of the light path is determined by the respective local thickness of the solid body.

To compensate excessive light paths, a doping of the solid body 112 with a uniform effective thickness may optionally take place. The doping is selected in this case such that a doping density increases with decreasing thickness of the wedge-shaped solid body 112.

Alternatively, the second coating 146 may also be formed on a second solid body or substrate. However, said substrate would have to be passed by the amplified seed laser radiation field 132, without the possibility for an effective cooling.

In principle, the seed laser radiation field 132 and the pump laser radiation field 122 do not have to be in the same plane of incidence. A rotation of the wedge-shaped solid body 112 with respect to the symmetry plane 184 should preferably not be selected too large, as this leads in the least favorable case to an increase in the reflection angle instead of to a reduction.

Preferably both the pump laser radiation field 122 and the seed laser radiation field 132 may be collimated. In this case preferably a beam divergence of smaller than 1° is achieved.

If the pump light source is a non-monochromatic pump light source, then only a part of the radiation generated thereby, i.e. a part of the spectrum, is trapped in the solid body 112 in the described manner. The portion of the pump laser radiation field 132 not trapped, i.e. the portion reflected back from the solid body 112 by the second coating 146, may again be deflected back to the solid body 112, e.g., by way of one or more mirrors and upon this second incidence, impinge on the solid body 112 at an angle which is optimized to the remaining spectrum and which enables trapping this part of the spectrum of the pump laser radiation field 132.

For pump light sources of that kind, one possible option is to provide a dispersive element, for example a prism, a grating, a lens, or a suitable glass block, which approach the spectral angle behavior from the equation above for describing the tilting behavior of the coating, beyond the spectrum of the pump light source. It is thus possible with the dispersive element to collimate the different wavelengths in different angles, so that at least theoretically an input coupling of a non-monochromatic pump laser radiation field 122 into the solid body 112 in one single step is made possible.

Should further circulations take place, for example the amplified seed laser radiation field 132 may be deflected again at the solid body 112 by way of additional mirrors 136a and 136b. This is schematically depicted in FIG. 7.

An arrangement for checking a vulnerability of the system to a deformation of the solid body 112 is schematically depicted in FIG. 8. A small curvature on the upper side 138 and the lower side 116 was arithmetically considered here for example, in order to achieve a defocusing effect for the seed laser radiation field 132. A focus offset according to an ideal lens was evaluated as a quality criterion and compared with the offset of a once-reflected beam. FIG. 8 shows such a spherical deformation with a defocus by wedge convexity with a radius of r=500 mm. The beam designated in FIG. 8 with the reference numeral 186 results for a wavelength of 780 nm with multiple reflections. The beam designated with the reference numeral 188 in FIG. 8 has a wavelength of 700 nm and is reflected once at the surface of the solid body. Ideal lenses with a focal length f=10 mm are drawn in schematically as rectangles and designated with reference numeral 190. A reference plane 192 for defocus determination is drawn in as a circle.

For an estimation vis a vis a normal reflection, the change in the focus plane was determined by applying a curvature with a radius r=500 mm to the solid body 112. This results in the amplified seed laser radiation field 132, which is represented by the beam 186, resulting in a displacement from 10 mm to 10.161 mm, the reflected beam 188 on the other hand having a displacement from 10 mm to 10.444 mm. Expressed in refractive power, this means −1.58 diopter for the amplified beam 186 and −4.25 diopter for the reflected beam. The smaller the refractive power is, the better the result.

If in a second step the curvature of the solid body 112 is further reduced, i.e. a radius of r=5 m adopted, in order to more closely examine the phase behavior of the beams 186 and 188. All unproblematic imaging errors were not considered in this analysis. This results in an astigmatism on the order of about 3 wavelengths. A phase error in the reflective beam 188 is slightly greater than in the beam 186. Despite the increased number of circulations of the amplified beam 186, there results a similar phase image as for the reflected beam 188. This enables output couplings from intermediate reflections to sufficiently provide measurement information for an adaptive beam correction.

Image 9 shows in a grey-scale depiction higher order phase errors without tilting and defocus in radians. A surface curvature with a radius of r=5 m is assumed. An image field width is 10 mm. Depicted to the left in FIG. 9 is a reference beam 188 with a wavelength of 700 nm and a single reflection at the coating 146. Depicted to the right is the result for the beam 186 with a wavelength of 780 nm and multiple reflections.

Depicted in FIGS. 10 to 20 are possible variants for the input coupling of pump laser radiation fields 122 and seed laser radiation fields 132 into a wedge-shaped solid body 112 which is provided with coatings 118 and 146.

FIG. 10 shows the impingement of a pump laser radiation field 122 with multiple pump beams which are input coupled into the solid body 112 at slightly tilted angles. This approach has an advantage, because pump light sources often do not have an ideal beam profile, whereby angle requirements of the second coating 146 would be undershot. However, the required angle of incidence is always maintained along a conical face.

An arrangement for a seed laser radiation field 132 is depicted for example in FIG. 11. It impinges on the solid body 112 at a seed laser radiation field angle 176 and a seed laser radiation field rotation angle 182. The beam path for the seed laser radiation field 132 is depicted with a solid line, without the deflection mirror arrangement 134. The beam path with a second deflection mirror arrangement 134 comprising two deflection mirrors 136a and 136b is depicted with a dotted line. A second pass with a definite number of multiple reflections through the solid body 112 is possible as a result of the deflection mirrors 136a and 136b.

The described effect of a multiple pass of the solid body 112 by use of two coatings 118 and 146 may also be utilized by lasers in the case of resonators 148. As a result of the multiple reflections in the solid body 112, an effective thickness of the amplifying medium is increased so that fewer resonator circulations are necessary in order to enable a stable laser operation.

In FIGS. 13 to 15, in each case a solid body 112 is schematically depicted, the first coating 118 of which is configured to be highly reflective and the second coating 146 of which is configured in the form of a bandpass filter.

FIG. 13 shows the incidence of a radiation field 194 at a radiation field angle 196 in relation to the surface normal 174 of the upper side 138. Here, the entry condition is fulfilled. The upper side 138 forms a full-surface input coupling opening 154 for the radiation field 194. The latter may be concerning in particular the pump laser radiation field 122 or the seed laser radiation field 132. Here, as laid out above, multiple reflections in the solid body 112 are made possible, before the radiation field 194 re-exits the solid body 112.

FIG. 14 shows schematically that the second coating 146 in the form of a bandpass is highly reflective and thus impermeable to too flat and too steep radiation field angles 196. The radiation field 194 thus cannot penetrate into the solid body 112 when the radiation field angle 196 is not adapted.

If the radiation field angle 196, as schematically depicted in FIG. 15, is not close enough to an edge of the progression of the optical density of the second coating 146, i.e., e.g., to the edges 160 and 162 or 168 and 170, respectively, then the radiation field 194 may again output couple from the solid body 112 unhindered, after a reflection at the first coating 118.

If the second coating 146 is configured in the form of a double bandpass, then, as is schematically depicted in FIG. 16, the radiation field 194 may input couple at a rising edge at a flat angle and output couple from the solid body 112 at a falling edge at a steep angle.

Instead of providing a double bandpass as coating 146, both the coating 118 and 146 may each be configured as a single bandpass, as is schematically depicted in FIG. 17. An input coupling of the radiation field 194 into the solid body 112 then occurs at a radiation angle 196 which is greater than an exit angle of the exiting radiation field 194.

Instead of providing one or more dichroic coatings 118 or 146, both the first coating 118 and the second coating 146 may be configured in the form of highly reflective coatings. In order to enable the input coupling of the radiation field 194 into the solid body 112, an input coupling opening 154 is formed by an uncoated input coupling or surface region 198. Only in this surface region 198 is the upper side 138 permeable to the radiation field 194, as is depicted for example in FIG. 18. The trapping of the radiation field 194 is achieved by corresponding angle conditions which, after a back reflection at the first coating 118, lead to the radiation field 194 impinging on the second coating 146 outside of the surface region 198. The radiation field 194 then passes through the input coupling opening 154 again after a multiple reflection. If the radiation field 194 impinges on the second coating 146 next to the surface region 198, then it is reflected by the same, as schematically depicted in FIG. 18, so that the radiation field 194 is not able to penetrate into the solid body 112.

The proposed configuration of the solid body 112 with a highly reflective coating 118 and a dichroic coating 146 may also be used in such a way so as to input couple the seed laser radiation field 132, as schematically depicted in FIG. 19, into a cuboidal solid body through a side face 200 which runs transverse, in particular perpendicular or substantially perpendicular, to the upper side plane 140 or to the lower side plane 142. This corresponds to the approach in the case of a slab laser. The pump laser radiation field 122 may then be input coupled into the solid body 112, as in a variant which is depicted in FIG. 13, by the second coating 146 which wavelength-selectively defines the input coupling opening 144.

Depicted in FIG. 20 is a further variant which may be used in particular in non-monochromatic and spectrally wide pump light sources. Here the pump laser radiation field 122 is broken down into its spectral components with a dispersive element 202. These impinge on the solid body 112 at different radiation field angles 196a and 196b. Because the coating 146 is configured to be angle of incidence-dependent and wavelength-dependent, both spectral components of the pump laser radiation field 142 may be simultaneously input coupled into the solid body 112 and trapped therein in the described manner. The dispersive element 202 may be configured in the form of a prism or a grating.

For adapting to a spectrum of the pump light source, the dispersive element 202 may in particular be applied in the form of a transmission grating directly to the upper side 138 of the solid body 112.

The angle of inclination 144 is preferably specified dependent on a progression of the optical density of the coating 118 and the coating 146, respectively. Depending on the angle of incidence, the spectral angular dependence, the effective refractive index of the coating, and the refractive index of the substrate, the angle of inclination 144 may thus be individually determined and optimized for the solid body.

Depicted for example in FIG. 21 is a further embodiment of a solid body 112. For the sake of clarity, the same reference numerals are used for some components of the solid body in FIG. 21 as in the embodiments described above of an integrally formed solid body 112.

Unlike in the solid bodies 112 depicted in FIGS. 2 to 19 and described above, the solid body 112 depicted in FIG. 21 is of multi-part configuration, namely two-part. It comprises a first part 204 and a second part 206. The parts 204 and 206 are subsequently also referred to as first solid body element 208 and second solid body element 210.

The solid body elements 208 and 210 are of discoidal or cuboidal configuration. The first solid body element 208 has a first upper side 212 and a first lower side 214. The second solid body element 210 has a second upper side 216 and a second lower side 218.

The first upper side 212 and the first lower side 214 run parallel to each other. The second upper side 216 and the second lower side 218 also run parallel to each other. Plane-parallel solid body elements 208 and 210 are thereby defined.

The solid body elements 208 and 210 are arranged somewhat tilted to each other, wherein the first lower side 214 faces toward the second upper side 216 and vice versa. As a result of this arrangement, the first upper side 214 and the second upper side 216 enclose the angle of inclination 144 between them.

In the two-part solid body 112 depicted in FIG. 21, the second lower side 218 of the first solid body element 208 forms the lower side 116 defined in the other embodiments. The first lower side 114 of the second solid body element 210 forms the upper side 138 of the solid body 112.

The upper side 138 defines in turn the upper side plane 140. The lower side 116 defines the lower side plane 142. Correspondingly, also in the case of the embodiment of the solid body 112 depicted in FIG. 21, the lower side 116 is provided with the first reflective coating 118 and the upper side 138 is provided with the second reflective coating 146.

In particular, the second solid body element 210 may contain the laser-active material. The first solid body element 208 may be formed of glass, for example, and then serves substantially as a substrate for the second reflective coating 146.

In the embodiment of the solid body 112 depicted in FIG. 21, too, the upper side 138 and/or the lower side 116 optionally comprise at least one optical input coupling opening for input coupling a seed laser radiation field 132 and/or a pump laser radiation field 122 into the solid body 112 between the reflective coatings 118 and 146. For the sake of clarity, the radiation field 194 is drawn in FIG. 21 as a way of example for the total of three possible options.

The described configuration of the solid body 112 with the two solid body elements 208 and 210 enables input coupling a radiation field 194 through the optical input coupling opening 154 which may be formed as in the embodiments described above, e.g., by the particular coating 146.

In order to input couple the radiation field 194 into the second solid body element 210 as entirely as possible, it is advantageous if the second upper side 216 is provided or equipped with an anti-reflection layer 220 in order to avoid as much as possible back and forth reflections between the first lower side 214 and the second upper side 216.

The coatings 118 and 146 may be selected in particular as in the embodiments of solid bodies 112 described above, and likewise the angle of inclination 144.

A further embodiment of a two-part solid body designated as a whole with the reference numeral 112 is depicted schematically in FIG. 22. It comprises in turn a first solid body element 208 and a second solid body element 210, which are provided in an analogous manner with coatings 118 and 146.

For the sake of clarity, the same reference numerals are used in FIG. 22 as in the embodiment of the two-part solid body 112 depicted in FIG. 21.

The second upper side 216 may optionally be provided with the anti-reflection layer 220.

The solid body elements 208 and 210 inclined in relation to each other define the angle of inclination 144 between the upper side plane 140 and the lower side plane 142.

In contrast to the solid body 112 as it is depicted in FIG. 21, in the solid body 112 in FIG. 22 the solid body elements 208 and 210 are arranged spaced further apart from each other.

An imaging device 222 is arranged between the solid body elements 208 and 210. The same may be configured, e.g., as 4f-imaging and serve as a so-called relay optic. The imaging device 222 is depicted for example in FIG. 22 with two lenses 224 and 226. It may in principle also comprise further optical elements, in particular lenses.

The imaging device 222 serves in particular for bridging the spatial distance, also referred to as free light path, between the first lower side 214 and the second upper side 216. The imaging device 222 is preferably arranged and configured in such a way that the radiation field 194 is imaged from the upper side plane 140 onto the lower side plane 142.

The imaging device 222 enables, in particular in the case of a configuration in the form of a 4f-imaging, a larger useable area of the second solid body element 210.

The functioning of the two-part solid body 112 corresponds to the functioning of the embodiments described above of integrally formed solid bodies 112.

Forming the solid body 112 in multiple parts, in particular two parts, as described in connection with FIGS. 21 and 22, has in particular the advantage that the components used have a lesser geometric complexity.

Finally, it should be emphasized again that the use of a solid body 112 which has an input coupling opening 154 is suited both for pumping and for clearing the laser-active material. Whether the solid body 112 is integrally formed or is of multi-part configuration hereby does not matter.

A particular advantage of the invention lies in particular in a significantly reduced complexity of the optical assembly of the laser amplification system 128, so that high power laser sources may be produced with significantly lower expenditures on equipment and costs associated therewith.

Solid-state lasers 110 with solid bodies 112 in accordance with the invention may be used in particular in material processing and further particularly in laser cutting, laser jointing, laser sintering, and laser engraving. Further, they are also suited for laser ablative drives and for the removal of debris in outer space.

REFERENCE NUMERAL LIST 10 solid-state laser
12 solid body
14 cooling arrangement
16 lower side
18 first coating
20 pump laser
22 pump laser radiation field
24 first deflection mirror arrangement
26a, 26b, 26c deflection mirror
28 laser amplification system
30 seed laser
32 seed laser radiation field
34 second deflection mirror arrangement
36a, 36b, 36c, 36d deflection mirror
110 solid-state laser
112 solid body
114 cooling arrangement
116 lower side
118 first coating
120 pump laser
122 pump laser radiation field
124 first deflection mirror arrangement
126a deflection mirror
128 laser amplification system
130 seed laser
132 seed laser radiation field
134 second deflection mirror arrangement 136a, 136b deflection mirror
138 upper side
140 upper side plane
142 lower side plane
144 angle of inclination
146 second coating
148 resonator
150 end mirror
152 output coupling mirror
154 input coupling opening
156 coating
158 bandpass filter
160 edge
162 edge
164 permeable region
166 permeable region
168 edge
170 edge
172 pump laser radiation field angle
174 surface normal
176 seed laser radiation field angle
178 surface normal
180 pump laser radiation field rotation angle
182 seed laser radiation field rotation angle
184 symmetry plane
186 beam
188 beam
190 lens
192 reference plane
194 radiation field
196a, 196b radiation field angle
198 surface region
200 side face
202 dispersive element
204 first part
206 second part
208 first solid body element
210 second solid body element
212 first upper side
214 first lower side
216 second upper side
218 second lower side
220 anti-reflection layer
222 imaging device
224 lens
226 lens

What is claimed is:

1. A discoidal or cuboidal solid body for a laser amplification system of a solid-state laser, which solid body comprises:
at least one laser-active material, and
an upper side defining an upper side plane and a lower side defining a lower side plane, wherein:
the upper side plane and the lower side plane are inclined in relation to each other and enclose an angle of inclination,
the lower side is provided with a first reflective coating,
the upper side is provided with a second reflective coating,
the upper side having an optical input coupling opening for input coupling a seed laser radiation field and a pump laser radiation field into the solid body between the first and the second reflective coating,
wherein:
the first reflective coating is configured in the form of a highly reflective coating;
the second reflective coating is configured in the form of a bandpass filter;
the bandpass filter forms the optical input coupling opening, and
the optical input coupling opening is configured in the form of a wavelength-dependent and angle of incidence-dependent input coupling opening for the pump laser radiation field and for the seed laser radiation field.

2. The solid body in accordance with claim 1, wherein the discoidal or cuboidal solid body is integrally formed or is of two- or multi-part configuration.

3. The solid body in accordance with claim 1, wherein it is of two- or multi-part configuration and comprises at least one first solid body element and at least one second solid body element.

4. The solid body in accordance with claim 3, wherein at least one of
a) at least one of the at least two solid body elements contains the laser-active material and
b) at least one of the at least two solid body elements contains the laser-active material, namely the at least one second solid body element and
c) at least one of the at least two solid body elements is formed of a material translucent to at least one of the seed laser radiation field and the pump laser radiation field and
d) at least one of the at least two solid body elements is formed of a material translucent to at least one of the seed laser radiation field and the pump laser radiation field, namely of glass and
e) the at least one first solid body element and the at least one second solid body element are configured plane-parallel and
f) the at least one first solid body element has a first upper side and a first lower side, wherein the at least one second solid body element has a second upper side and a second lower side, wherein the first lower side and the second upper side are arranged or formed facing each other, and wherein the first lower side forms the upper side defining the upper side plane, and wherein the second lower side forms the lower side defining the lower side plane and
g) the at least one first solid body element has a first upper side and a first lower side, wherein the at least one second solid body element has a second upper side and a second lower side, wherein the first lower side and the second upper side are arranged or formed facing each other, and wherein the first lower side forms the upper side defining the upper side plane, and wherein the second lower side forms the lower side defining the lower side plane, wherein the second upper side of the at least one second solid body element is provided with an anti-reflection layer.

5. The solid body in accordance with claim 3, wherein an imaging device is arranged or formed between the at least one first solid body element and the at least one second solid body element.

6. The solid body in accordance with claim 1, wherein the band pass filter at least one of:
has an edge steepness which is at least 1 OD/3 nm, and
has a high extinction ratio.

7. The solid body in accordance with claim 1, wherein the solid body is configured in the form of a crystal or is formed of glass.

8. The solid body in accordance with claim 1, wherein at least one of the first and the second coating are configured at least one of:
   a) in the form of a dichroic coating, and
   b) to be polarization-independent.

9. The solid body in accordance with claim 1, wherein the laser-active material comprises at least one chemical element from the group of lanthanides or a transition metal.

10. The solid body in accordance with claim 1, wherein the angle of inclination is greater than 0° and less than or equal to 3°.

11. The solid body in accordance with claim 1, wherein the angle of inclination is in a range of between 0.5° and 1.5°.

12. The solid body in accordance with claim 1, wherein the input coupling opening extends over substantially an entire surface of the solid body or over an entire surface of the solid body, which surface is defined by the upper side of the solid body.

13. The solid body in accordance with claim 1, wherein the solid body is configured in the form of a crystal, wherein the crystal is formed of yttrium aluminum garnet or sapphire or of a semiconductor.

14. The solid body in accordance with claim 1, wherein the solid body is doped with the laser-active material.

15. The solid body in accordance with claim 1, wherein the solid body is cuboidal and has a first and a second side face, and wherein the first and second side face run transverse to at least one of the upper side plane and to the lower side plane.

16. The solid body in accordance with claim 1, wherein the solid body has a thickness, which corresponds to a distance between the upper side and the lower side, in a range of about 100 um to about 1000 um.

* * * * *